(12) United States Patent
Foskey et al.

(10) Patent No.: US 11,603,191 B1
(45) Date of Patent: Mar. 14, 2023

(54) STOWABLE LIFT ROTORS FOR VTOL AIRCRAFT

(71) Applicant: Textron Innovations Inc., Providence, RI (US)

(72) Inventors: Christopher Edward Foskey, Keller, TX (US); Robert Roe, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 56 days.

(21) Appl. No.: 17/407,108

(22) Filed: Aug. 19, 2021

(51) Int. Cl.
| | |
|---|---|
| *B64C 27/00* | (2006.01) |
| *B64C 29/00* | (2006.01) |
| *B64D 27/24* | (2006.01) |
| *B64C 39/04* | (2006.01) |

(52) U.S. Cl.
CPC ........ *B64C 27/001* (2013.01); *B64C 29/0033* (2013.01); *B64C 39/04* (2013.01); *B64D 27/24* (2013.01); *B64C 2027/002* (2013.01)

(58) Field of Classification Search
CPC ................................ B64C 39/04; B64C 27/30
See application file for complete search history.

(56) References Cited

U.S. PATENT DOCUMENTS

| | | | | |
|---|---|---|---|---|
| 2010/0282901 | A1* | 11/2010 | Mason | ..................... B64C 25/18 244/102 R |
| 2018/0362154 | A1* | 12/2018 | Louis | ...................... B64C 27/30 |
| 2019/0248481 | A1* | 8/2019 | Speller | ................ B64C 29/0033 |
| 2021/0031910 | A1* | 2/2021 | Comes | ..................... B64C 27/30 |

* cited by examiner

*Primary Examiner* — Richard Green
*Assistant Examiner* — Ashesh Dangol
(74) *Attorney, Agent, or Firm* — Lawrence Youst PLLC

(57) ABSTRACT

A stowable lift rotor is coupled to an airframe of a VTOL aircraft. The VTOL aircraft is convertible between a VTOL flight mode and a forward flight mode. The stowable lift rotor includes a lift arm. The proximal end of the lift arm is coupled to the airframe of the VTOL aircraft. The stowable lift rotor also includes a rotor assembly including rotor blades coupled to the distal end of the lift arm. The lift arm is movable between various positions including an extended position in the VTOL flight mode, a stowed position in the forward flight mode and intermediate positions therebetween such that the distance between the rotor assembly and the airframe is greater in the extended position than in the stowed position.

12 Claims, 15 Drawing Sheets

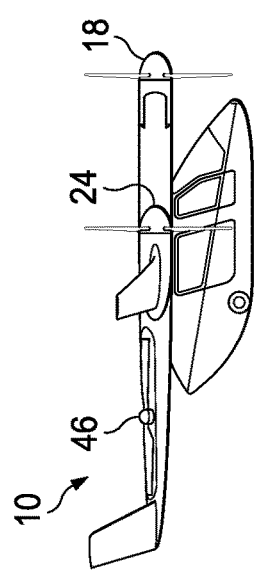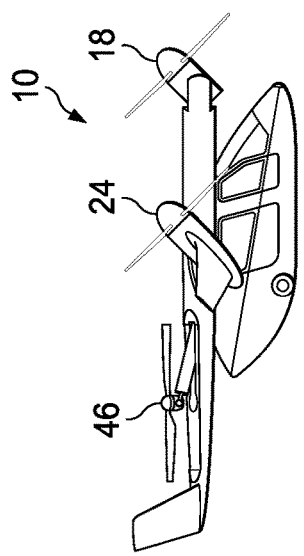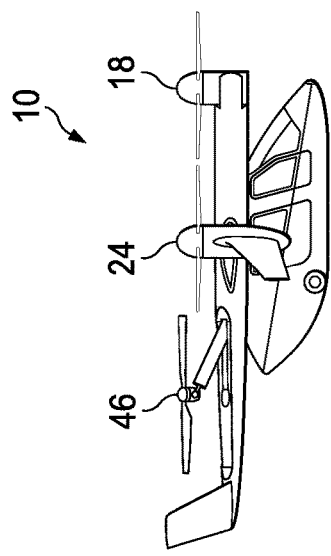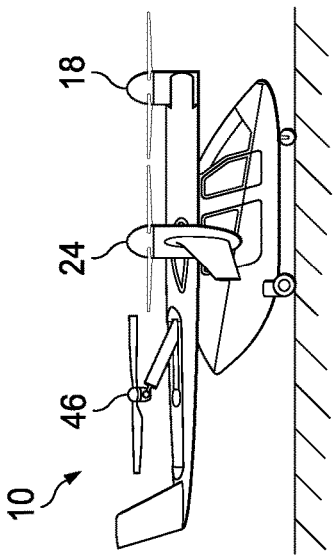

STOWABLE LIFT ROTORS FOR VTOL AIRCRAFT

TECHNICAL FIELD OF THE DISCLOSURE

The present disclosure relates, in general, to lift rotors for VTOL aircraft convertible between a VTOL flight mode and a forward flight mode and, in particular, to stowable lift rotors that move between various positions including an extended position in the VTOL flight mode to reduce noise and a stowed position in the forward flight mode to reduce drag.

BACKGROUND

Fixed-wing aircraft such as airplanes are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another type of VTOL aircraft, attempt to overcome this drawback by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric VTOL (eVTOL) aircraft are a type of VTOL aircraft that utilizes electricity, either exclusively or in conjunction with liquid fuel, to power the various systems of the aircraft including the propulsion system(s). Because eVTOL aircraft are versatile and do not require a runway, eVTOL aircraft are particularly useful in applications related to urban air mobility. EVTOL aircraft include VTOL aircraft that use a hybrid electric propulsion system such as an engine running a generator producing electricity and battery-stored power as well as VTOL aircraft that use a turbo-electric propulsion system such as an engine running a generator providing all power required by the aircraft. One particular type of eVTOL aircraft is an electric tiltrotor aircraft.

VTOL aircraft that are capable of converting between VTOL flight mode and forward flight mode may utilize one or more lift rotors that provide lift in the VTOL flight mode but do not rotate their planes of rotation when the VTOL aircraft converts to the forward flight mode. In the VTOL flight mode an adequate distance should be maintained between the lift rotor assembly and the airframe of the aircraft to reduce the noise produced by the lift rotor and improve the overall acoustic signature of the aircraft. Conversely, in the forward flight mode the distance between the lift rotor assembly and the airframe of the aircraft should be minimized to expose less of the lift rotor to freestream airflow and therefore reduce drag in forward flight. Accordingly, a need has arisen for stowable lift rotors that are capable of adjusting the distance between the lift rotor assembly and the airframe of the aircraft based on the flight mode of the aircraft, thereby reducing noise in the VTOL flight mode and reducing drag in the forward flight mode. A need has also arisen for lift rotors that are capable of being fully or partially shrouded and/or locked into a single position while the VTOL aircraft is in the forward flight mode to further reduce drag.

SUMMARY

In a first aspect, the present disclosure is directed to a stowable lift rotor coupled to an airframe of a VTOL aircraft. The VTOL aircraft is convertible between a VTOL flight mode and a forward flight mode. The stowable lift rotor includes a lift arm. The proximal end of the lift arm is coupled to the airframe of the VTOL aircraft. The stowable lift rotor also includes a rotor assembly including rotor blades coupled to the distal end of the lift arm. The lift arm is movable between various positions including an extended position in the VTOL flight mode, a stowed position in the forward flight mode and intermediate positions therebetween such that the distance between the rotor assembly and the airframe is greater in the extended position than in the stowed position.

In some embodiments, the airframe may form a recess to receive the lift arm in the stowed position. In certain embodiments, the lift arm may move between the stowed and extended positions in response to the magnitude of lift generated by the rotor assembly. In some embodiments, the proximal end of the lift arm may include a forward end rotatably coupled to the airframe of the VTOL aircraft and the distal end of the lift arm may include an aft end rotatably coupled to the rotor assembly. In certain embodiments, the stowable lift rotor may include a motor coupled to the airframe of the VTOL aircraft adjacent to the proximal end of the lift arm. In such embodiments, the lift arm may include a driveshaft transmitting rotational energy from the motor at the proximal end of the lift arm to the rotor assembly at the distal end of the lift arm. In some embodiments, the stowable lift rotor may include a set of bevel gears transmitting rotational energy from the motor to a proximal end of the driveshaft and another set of bevel gears transmitting rotational energy from a distal end of the driveshaft to the rotor assembly. In certain embodiments, the rotor assembly may include a rotor hub housing and the lift arm may include a linkage, the proximal end of the linkage rotatably coupled to the airframe of the VTOL aircraft and the distal end of the linkage rotatably coupled to the rotor hub housing. In some embodiments, the stowable lift rotor may include an actuator assembly configured to move the lift arm between the extended position and the stowed position. In certain embodiments, the actuator assembly may include a ball screw actuator assembly and a strut, a first end of the strut coupled to the ball screw actuator assembly and a second end of the strut coupled to the lift arm.

In some embodiments, the lift arm may include a telescoping shaft assembly including a lower shaft slidably coupled to an upper shaft, the lower shaft coupled to the airframe of the VTOL aircraft and the upper shaft coupled to the rotor assembly. In certain embodiments, the lower shaft may include one of a male spline or a female spline and the upper shaft may include the other of the male spline or the female spline to form a slidable spline joint therebetween. In some embodiments, the stowable lift rotor may include a motor coupled to the airframe of the VTOL aircraft adjacent to the proximal end of the telescoping shaft assembly, the motor configured to rotate the telescoping shaft assembly such that the telescoping shaft assembly transmits rotational energy from the motor to the rotor assembly. In certain embodiments, the stowable lift rotor may include a motor coupled to the upper shaft of the telescoping shaft assembly, the motor configured to rotate the rotor assembly. In some embodiments, the telescoping shaft assembly may include a spring configured to exert a spring force biasing the upper shaft toward the lower shaft. The spring may move the telescoping shaft assembly into the stowed position in response to the spring force exceeding a lift force generated by the rotor assembly and the rotor assembly may move the telescoping shaft assembly into the extended position in response to the lift force generated by the rotor assembly exceeding the spring force. In certain embodiments, the telescoping shaft assembly may include a damper configured to reduce vibration transmission between the rotor assembly and the airframe. In some embodiments, the rotor blades may include first and second rotor blades and the rotor assembly may be lockable in the stowed position such that the first and second rotor blades are parallel to a longitudinal axis of the VTOL aircraft, thereby reducing drag by minimizing the frontal profile area of the rotor assembly exposed to freestream airflow in the forward flight mode.

In a second aspect, the present disclosure is directed to a VTOL aircraft convertible between a VTOL flight mode and a forward flight mode including a fuselage, a tailboom coupled to the fuselage and a stowable lift rotor coupled to the tailboom. The stowable lift rotor includes a lift arm. The proximal end of the lift arm is coupled to the tailboom. The stowable lift rotor also includes a rotor assembly including rotor blades coupled to the distal end of the lift arm. The lift arm is movable between various positions including an extended position in the VTOL flight mode, a stowed position in the forward flight mode and intermediate positions therebetween such that the distance between the rotor assembly and the tailboom is greater in the extended position than in the stowed position.

In some embodiments, the VTOL aircraft may include a wing coupled to the fuselage. In such embodiments, the tailboom may include left and right tailbooms coupled to the fuselage via the wing and the stowable lift rotor may include left and right stowable lift rotors, the left stowable lift rotor coupled to the left tailboom and the right stowable lift rotor coupled to the right tailboom. In certain embodiments, the stowable lift rotor may include a four-bar linkage extending through the lift arm. In some embodiments, the rotor blades may be rotatable in a first rotational plane in the extended position, the rotor blades may lie in a second plane in the stowed position and the first rotational plane may be substantially parallel to the second plane.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4H are schematic illustrations of a VTOL aircraft utilizing stowable lift rotors in a sequential flight-operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
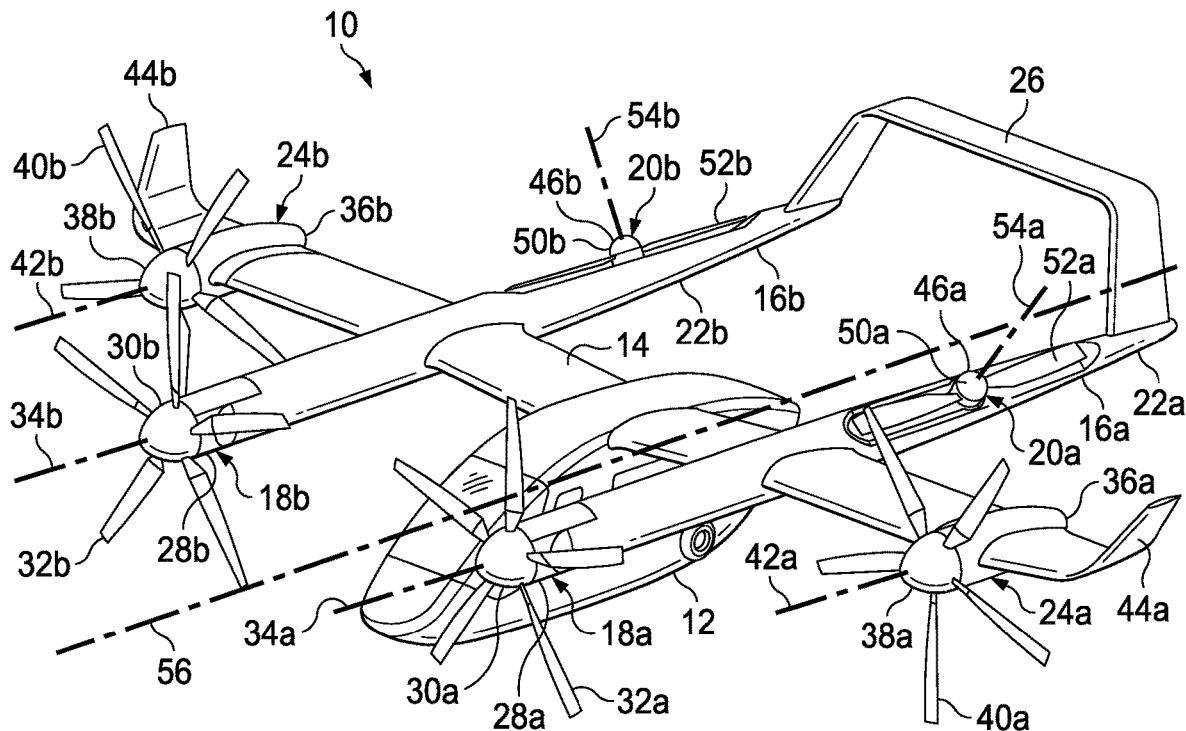
FIGS. 1A-1E are schematic illustrations of a VTOL aircraft utilizing stowable lift rotors in accordance with embodiments of the present disclosure.
Figure 1B:
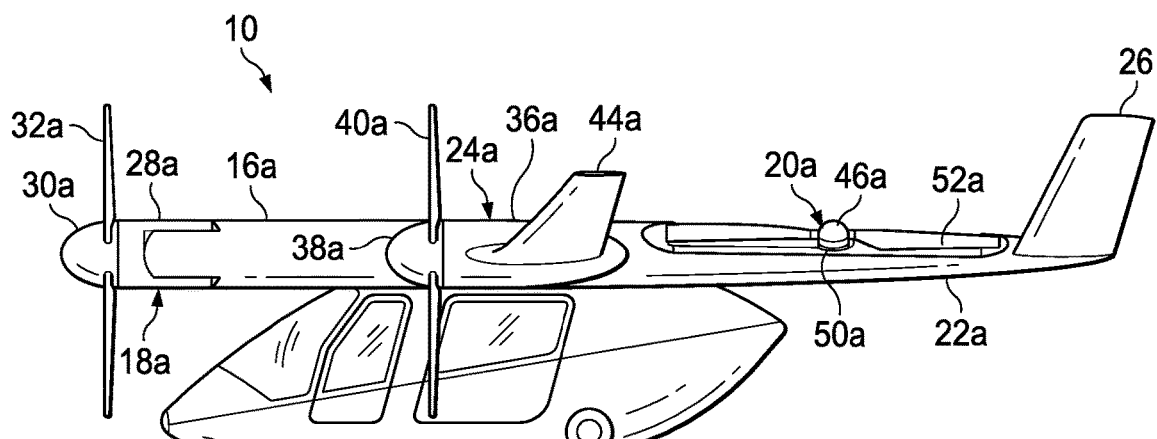
Figure 1C:
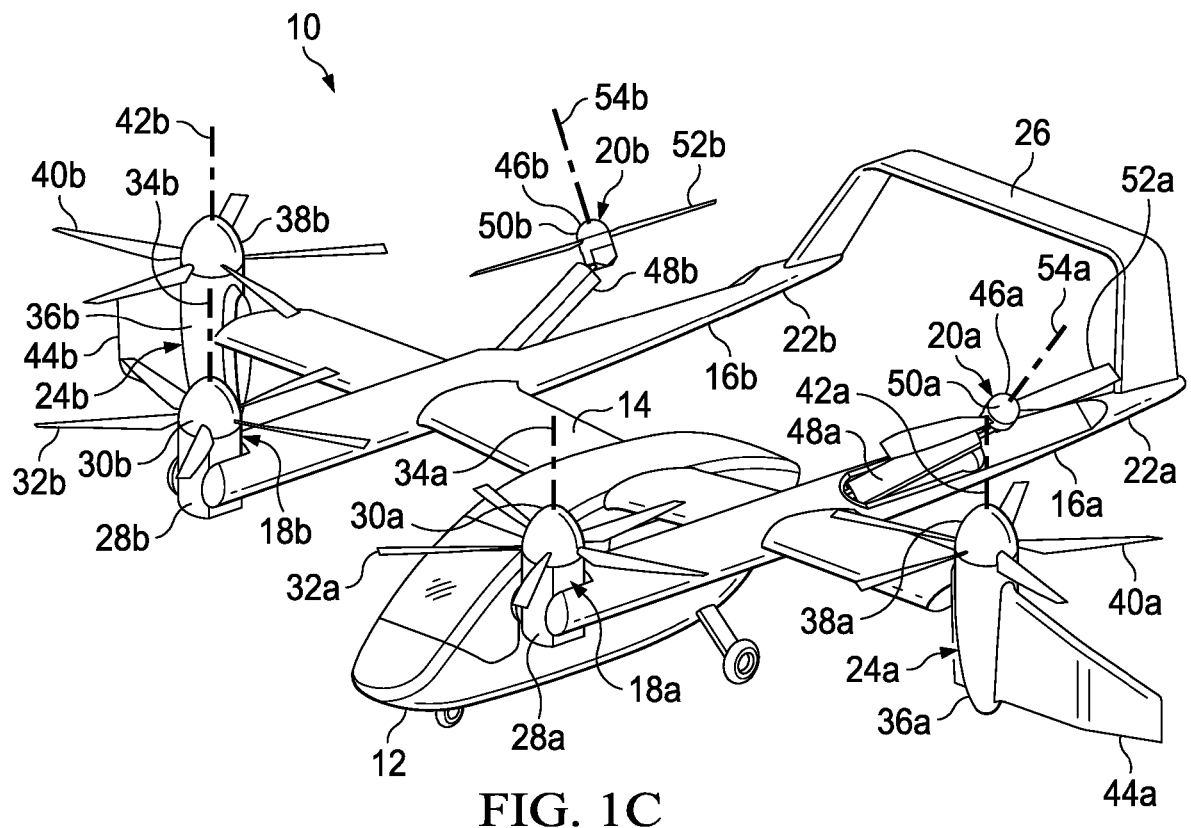
Figure 1D:
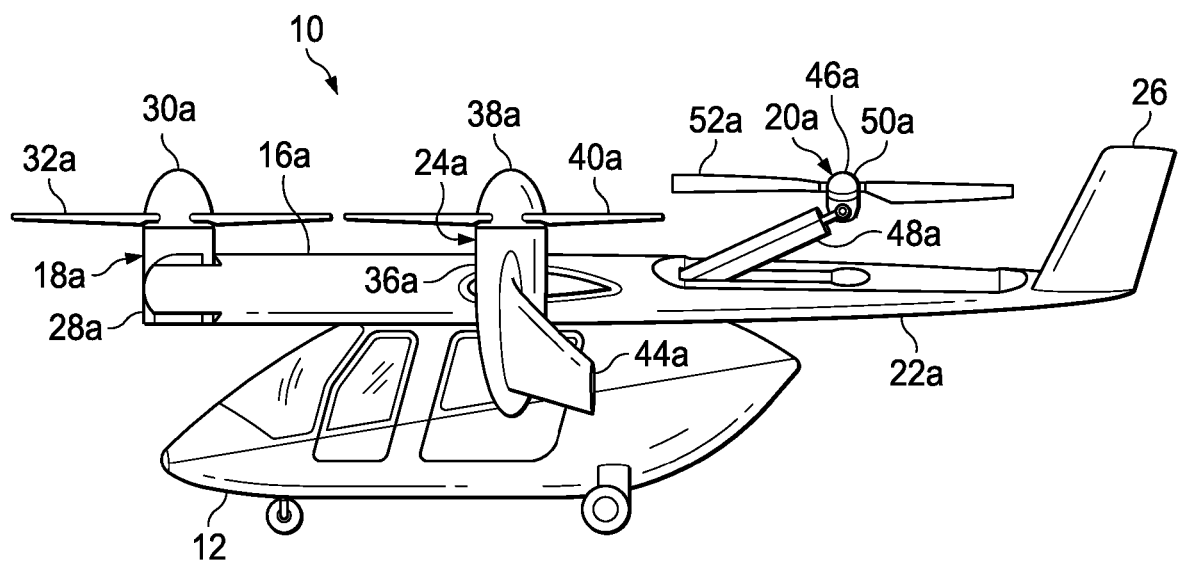
Figure 1E:
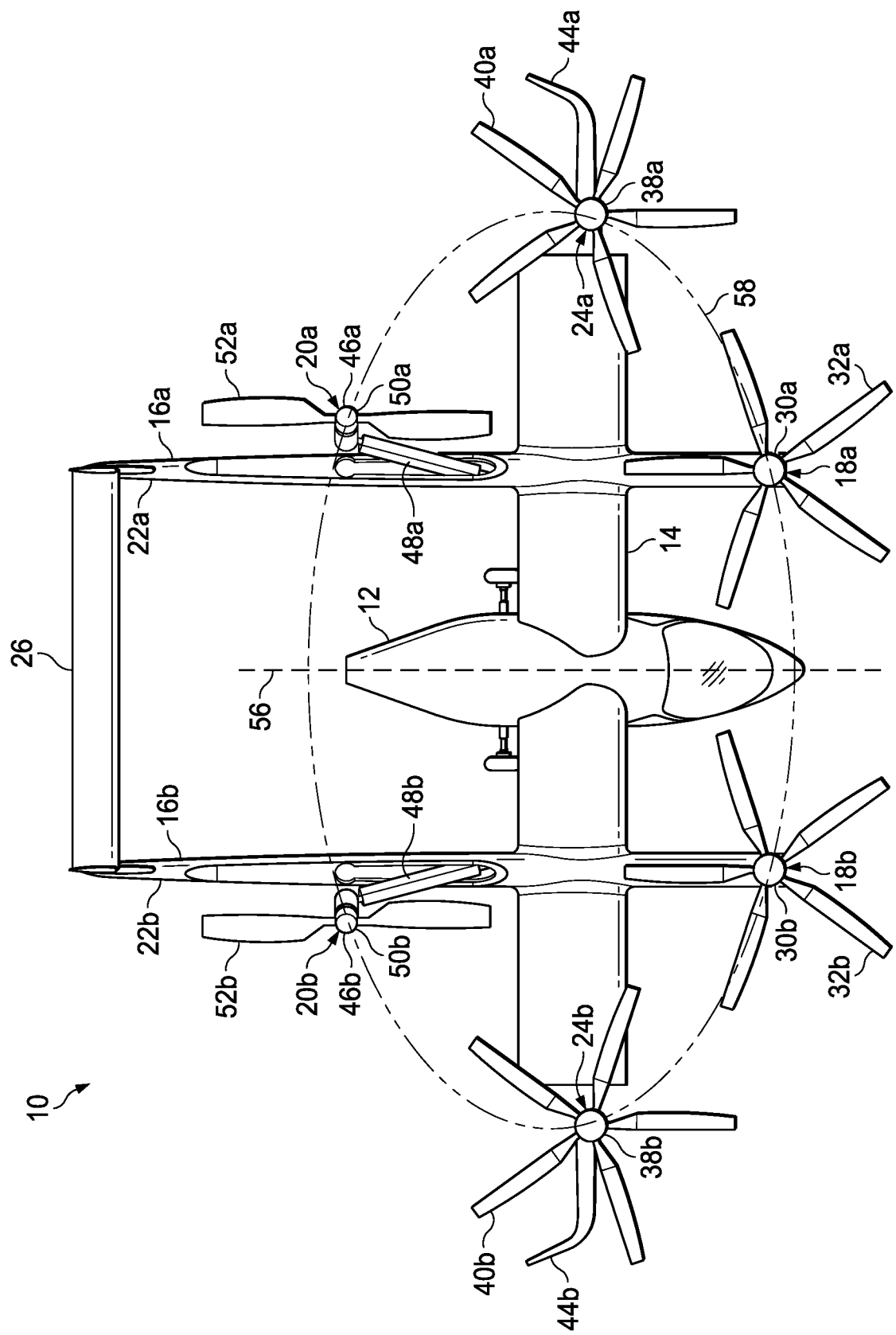

Referring to FIGS. 1A-1E in the drawings, a VTOL aircraft depicted as a tiltrotor aircraft is schematically illustrated and generally designated 10. Aircraft 10 includes a fuselage 12, a wing 14 coupled to fuselage 12 and left and right booms 16a, 16b coupled to wing 14 on opposite sides of fuselage 12. Aircraft 10 includes three pairs of propulsion systems including forward propulsion systems 18a, 18b rotatably coupled to the forward ends of booms 16a, 16b adjacent to the forward end of fuselage 12, aft propulsion systems 20a, 20b coupled to tailboom portions 22a, 22b of booms 16a, 16b adjacent to the aft end of fuselage 12 and wing-mounted propulsion systems 24a, 24b rotatably coupled to the outboard ends of wing 14. FIGS. 1A-1B depict aircraft 10 in a forward flight, or airplane, mode wherein propulsion systems 18a, 18b, 24a, 24b provide forward thrust with the forward airspeed of aircraft 10 providing wing-borne lift, thereby enabling aircraft 10 to have a high speed and/or high endurance forward flight mode. Aircraft 10 may also perform a horizontal takeoff or landing in the forward flight mode. FIGS. 1C-1E depict aircraft 10 in a vertical takeoff and landing (VTOL), or helicopter, flight mode wherein propulsion systems 18a, 18b, 20a, 20b, 24a, 24b provide thrust-borne lift allowing for vertical takeoff and landing, hovering and low speed directional movement. Aircraft 10 is convertible between the forward flight mode shown in FIGS. 1A-1B and the VTOL flight mode shown in FIGS. 1C-1E. Aircraft 10 also includes a tail assembly 26 coupled to the aft ends of tailbooms 22a, 22b.

Each forward propulsion system 18a, 18b includes a pylon 28a, 28b housing a drive system therein. Each forward propulsion system 18a, 18b also includes a rotatable open proprotor assembly 30a, 30b having a plurality of proprotor blades 32a, 32b connected to a proprotor mast and configured to rotate about axes 34a, 34b. Each proprotor assembly 30a, 30b has five proprotor blades 32a, 32b, although the number of proprotor blades could be either greater than or less than five. The rotation of proprotor blades 32a, 32b about axes 34a, 34b generates lift while operating in the VTOL flight mode and thrust while operating in the forward flight mode. Each pylon 28a, 28b may house one or more electric motors configured to produce rotational energy that drives the rotation of proprotor assemblies 30a, 30b. Alternatively, each pylon 28a, 28b may house a gearbox that receives rotational energy from a driveshaft and drives the rotation of proprotor assemblies 30a, 30b. In alternative embodiments, forward propulsion systems 18a, 18b may be fixed in the VTOL configuration shown in FIGS. 1C-1E.

Each wing-mounted propulsion system 24a, 24b includes a pylon 36a, 36b housing a drive system therein. Each wing-mounted propulsion system 24a, 24b also includes a rotatable open proprotor assembly 38a, 38b having a plurality of proprotor blades 40a, 40b connected to a proprotor mast and configured to rotate about axes 42a, 42b. Each proprotor assembly 38a, 38b has five proprotor blades 40a, 40b, although the number of proprotor blades could be either greater than or less than five. In some embodiments, proprotor assemblies 38a, 38b may include a different number of proprotor blades than proprotor assemblies 30a, 30b. Wing extensions 44a, 44b extend from the outboard ends of pylons 36a, 36b. The rotation of proprotor blades 40a, 40b about axes 42a, 42b generates lift while operating in the VTOL flight mode and thrust while operating in the forward flight mode. Each pylon 36a, 36b may house one or more electric motors configured to produce rotational energy that drives the rotation of proprotor assemblies 38a, 38b. Alternatively, each pylon 36a, 36b may house a gearbox that receives rotational energy from a driveshaft and drives the rotation of proprotor assemblies 38a, 38b.

When aircraft 10 is operating in the VTOL flight mode and supported by thrust-borne lift, pylons 28a, 28b, 36a, 36b each have a generally vertical position such that proprotor blades 32a, 32b, 40a, 40b are rotating in generally the same horizontal plane, as best seen in FIG. 1D. When aircraft 10 is operating in the forward flight mode and supported by wing-borne lift, pylons 28a, 28b, 36a, 36b each have a generally horizontal position with forward propulsion systems 18a, 18b rotating generally in a forward vertical plane and wing-mounted propulsion systems 24a, 24b rotating generally in an aft vertical plane, as best seen in FIG. 1B. Aircraft 10 is operable to fly in all directions in the VTOL flight mode, although faster forward flight may be achievable while in the forward flight mode. In the forward flight mode, propulsion systems 18a, 18b, 24a, 24b direct their respective thrusts in the aft direction to propel aircraft 10 forward. Transitions between the VTOL flight mode and the forward flight mode of aircraft 10 are achieved by changing the angular positions of pylons 28a, 28b, 36a, 36b between their generally horizontal positions and their generally vertical positions. Pylons 28a, 28b, 36a, 36b may be tiltable between the vertical and horizontal positions by actuators (not shown) that are engaged in response to commands originating from a pilot, a flight control system or elsewhere.

Aft propulsion systems 20a, 20b provide thrust-borne lift for aircraft 10 in the VTOL flight mode. In previous aircraft, the aeroacoustic interaction between the blades of a lift rotor and the portion of the aircraft airframe to which the lift rotor is attached has given rise to high noise levels. The magnitude of the noise is determined by the distance between the lift rotor blades and the airframe, wherein a smaller distance between these two elements results in more noise. Conversely, increasing the distance between the lift rotor blades and the airframe extends the lift rotor into the freestream airflow around the aircraft and therefore incurs a drag penalty in forward flight. To address these and other drawbacks of previous lift rotors, aft propulsion systems 20a, 20b includes stowable lift rotors 46a, 46b pivotably coupled to tailbooms 22a, 22b, respectively. Stowable lift rotors 46a, 46b extend away from tailbooms 22a, 22b in the VTOL flight mode as shown in FIGS. 1C-1E for quiet operation and retract into a conforming position along tailbooms 22a, 22b in the forward flight mode as shown in FIGS. 1A-1B to reduce drag. Extending stowable lift rotors 46a, 46b away from tailbooms 22a, 22b in the VTOL flight mode also prevents stowable lift rotors 46a, 46b from striking tailbooms 22a, 22b in operation.

Each stowable lift rotor 46a, 46b includes an articulated lift arm 48a, 48b, the proximal ends of which are pivotably coupled to tailbooms 22a, 22b. Rotatably coupled to the distal ends of lift arms 48a, 48b are open rotor assemblies 50a, 50b including a plurality of rotor blades 52a, 52b configured to rotate about axes 54a, 54b. Each rotor assembly 50a, 50b has two rotor blades 52a, 52b, although the number of rotor blades could be either greater than or less than two. Each stowable lift rotor 46a, 46b includes, or is operatively coupled to, one or more electric motors configured to produce rotational energy to drive the rotation of rotor assemblies 50a, 50b about axes 54a, 54b, thereby generating lift while operating in the VTOL flight mode. Alternatively, each stowable lift rotor 46a, 46b may include a gearbox that receives rotational energy from a driveshaft to drive the rotation of rotor assemblies 50a, 50b. In the illustrated embodiment, stowable lift rotors 46a, 46b are canted slightly outboard. For example, axes 54a, 54b of stowable lift rotors 46a, 46b may be canted outboard relative to vertical axes in a range between one and twenty degrees such as between five and ten degrees. In other embodiments, stowable lift rotors 46a, 46b are not canted in the outboard direction such that rotor blades 52a, 52b rotate in a generally horizontal plane.

In the forward flight mode, stowable lift rotors 46a, 46b are in the stowed position shown in FIGS. 1A-1B. In the stowed position, rotor assemblies 50a, 50b are locked such that rotor blades 52a, 52b are generally parallel to a longitudinal axis 56 of aircraft 10, thereby reducing drag by minimizing the frontal profile areas of rotor assemblies 50a, 50b exposed to freestream airflow in the forward flight mode. When stowable lift rotors 46a, 46b cease rotating and are locked and aligned generally parallel with tailbooms 22a, 22b in the forward flight mode, the tip of one of the rotor blades for each rotor assembly 50a, 50b points in the forward direction of flight to minimize drag. In addition, stopping rotor assemblies 50a, 50b in the forward flight mode avoids ingestion of the slipstreams from propulsion systems 18a, 18b, 24a, 24b. Fewer active rotor assemblies in the forward flight mode also improves blade loading and propulsive efficiency of propulsion systems 18a, 18b, 24a, 24b. In the VTOL flight mode, stowable lift rotors 46a, 46b are in extended positions as shown in FIGS. 1C-1E. The distance between rotor assemblies 50a, 50b and tailbooms 22a, 22b is greater in the extended position than in the stowed position, which enhances the acoustic signature of aircraft 10 by lowering impulse and other noises. Thus, stowable lift rotors 46a, 46b allow rotor blades 52a, 52b to be in close proximity with tailbooms 22a, 22b during forward flight to reduce drag but moved away from tailbooms 22a, 22b in VTOL flight to reduce noise. Stowable lift rotors 46a, 46b may also be positioned in intermediate positions between the stowed and extended positions. In other embodiments, stowable lift rotors 46a, 46b may be coupled to extensions or other portions of aircraft 10 instead of tailbooms 22a, 22b.

Pylons 28a, 28b, 36a, 36b may be differentially tiltable and may vary in power to control the yaw of aircraft 10. Roll, pitch and yaw may also be managed using differential thrust between propulsion systems 18a, 18b, 20a, 20b, 24a, 24b by individually controlling, for example, blade pitch, rotational speed and/or motor power. In some embodiments, the pitch of individual blades 32a, 32b, 40a, 40b, 52a, 52b may be variable and selectively changed to control the direction, thrust and/or lift of aircraft 10. Because aircraft 10 includes six rotor assemblies, aircraft 10 may be referred to as a hexrotor aircraft. FIG. 1E illustrates a hexrotor arc arrangement 58 when aircraft 10 is in the VTOL flight mode. With six rotor assemblies, a rotor assembly can be lost while still allowing aircraft 10 to hover even without motor redundancy per rotor assembly. In the event of a rotor failure, the rotor on the opposite side of aircraft 10 may be powered down, allowing aircraft 10 to hover as a quadcopter with the four remaining rotors operating at elevated power levels. For example, if propulsion system 20a were to fail, propulsion system 18b may be powered down, allowing the thrusts of the remaining propulsion systems 18a, 24a, 24b, 20b to balance aircraft 10.

It should be appreciated that aircraft 10 is merely illustrative of a variety of aircraft that can implement the embodiments disclosed herein. Indeed, one or more stowable lift rotors 46a, 46b may be implemented on any aircraft. Other aircraft implementations can include helicopters, hybrid aircraft, tiltwing aircraft, quad tiltrotor aircraft, unmanned aircraft, gyrocopters, airplanes, compound helicopters, drones and the like. As such, those skilled in the art will recognize that stowable lift rotors 46a, 46b can be integrated into a variety of aircraft configurations. It should be appreciated that even though aircraft are particularly well-suited to implement the embodiments of the present disclosure, non-aircraft vehicles and devices can also implement the embodiments.

Figure 2A:
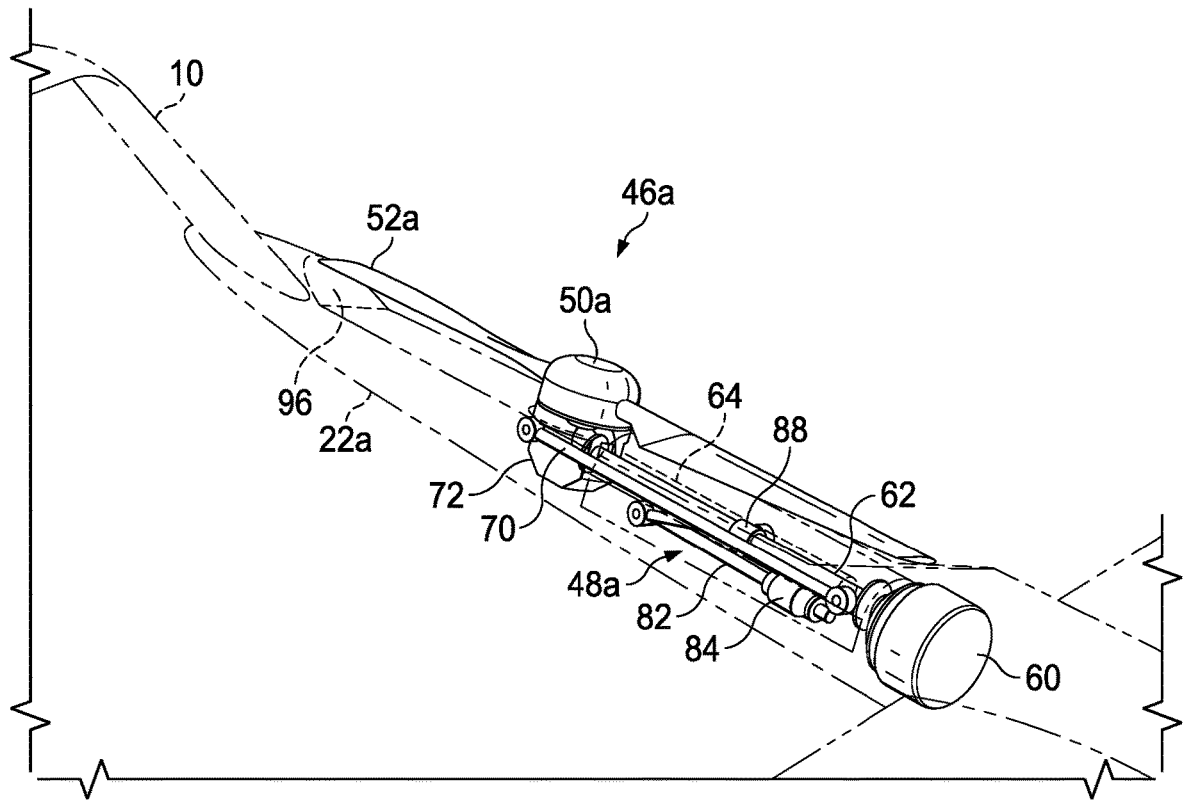
FIGS. 2A-2D are various views of a stowable lift rotor in a stowed position and an extended position in accordance with embodiments of the present disclosure.
Figure 2B:
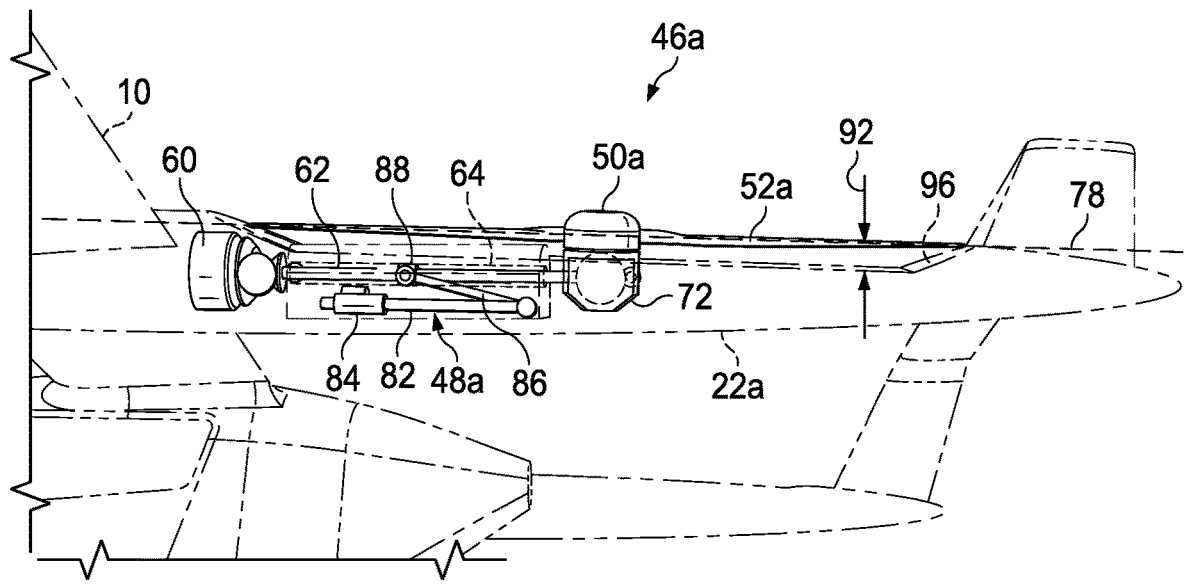
Figure 2C:
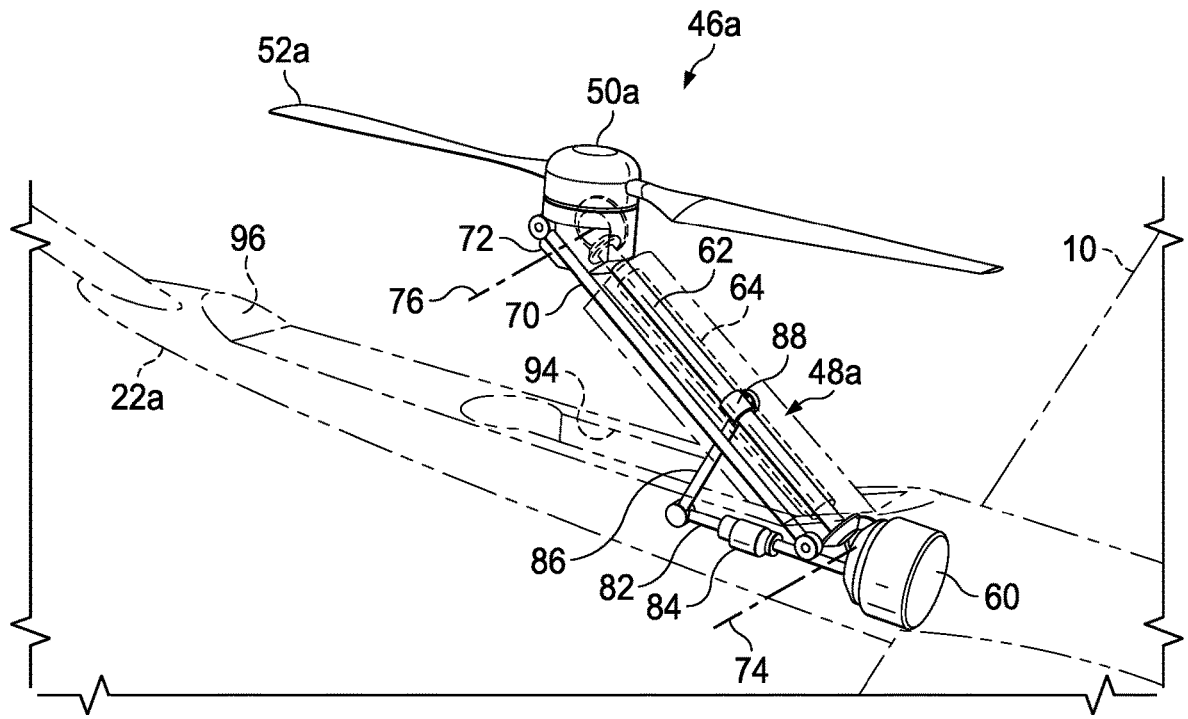
Figure 2D:
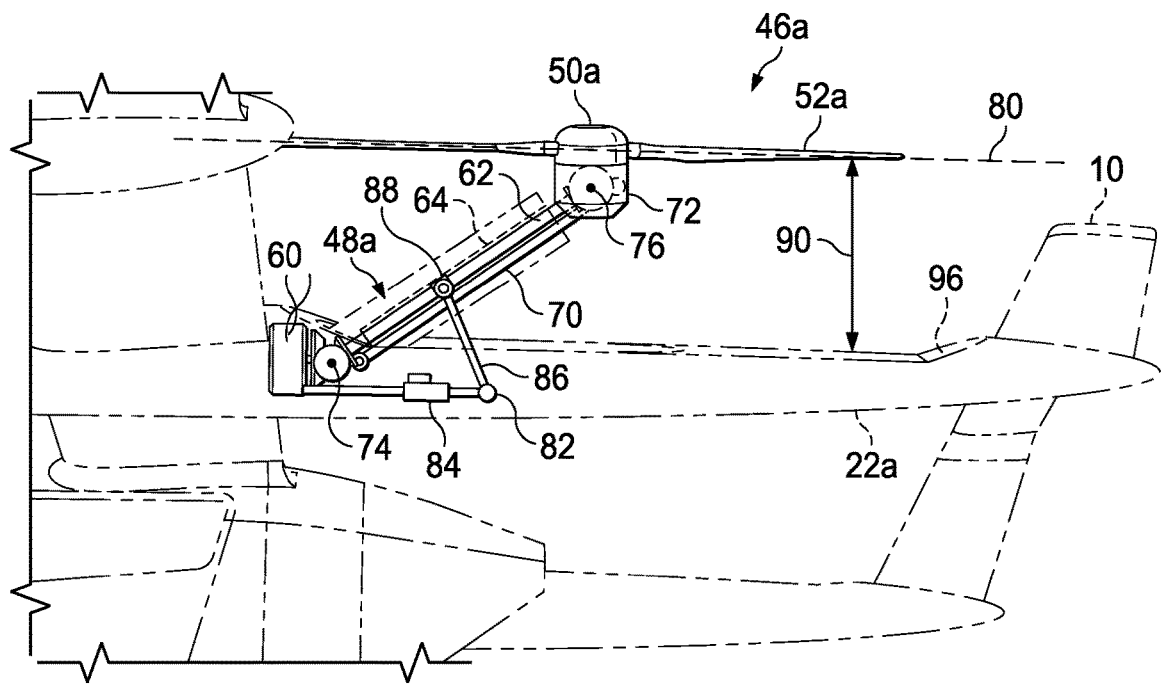

Referring additionally to FIGS. 2A-2D in the drawings, stowable lift rotor 46a of aircraft 10 is shown in various positions. Stowable lift rotor 46a is substantially similar to stowable lift rotor 46b therefore, for sake of efficiency, certain features will be disclosed only with regard to stowable lift rotor 46a. One having ordinary skill in the art, however, will fully appreciate an understanding of stowable lift rotor 46b based upon the disclosure herein of stowable lift rotor 46a. FIGS. 2A-2B show stowable lift rotor 46a in the stowed position while aircraft 10 is in the forward flight mode. FIGS. 2C-2D show stowable lift rotor 46a in the extended position while aircraft 10 is in the VTOL flight mode. The proximal and forward end of lift arm 48a is rotatably coupled to tailboom 22a. The distal and aft end of lift arm 48a is rotatably coupled to rotor assembly 50a, which includes rotor blades 52a. Stowable lift rotor 46a includes a motor 60 coupled to tailboom 22a adjacent to the proximal end of lift arm 48a. Motor 60 is disposed axially within tailboom 22a to maintain an aerodynamic shape for aircraft 10. Additionally, the placement of motor 60 adjacent to the forward end of lift arm 48a shifts the weight contribution of motor 60 closer to the center of gravity of aircraft 10 for enhanced performance.

Figure 3:
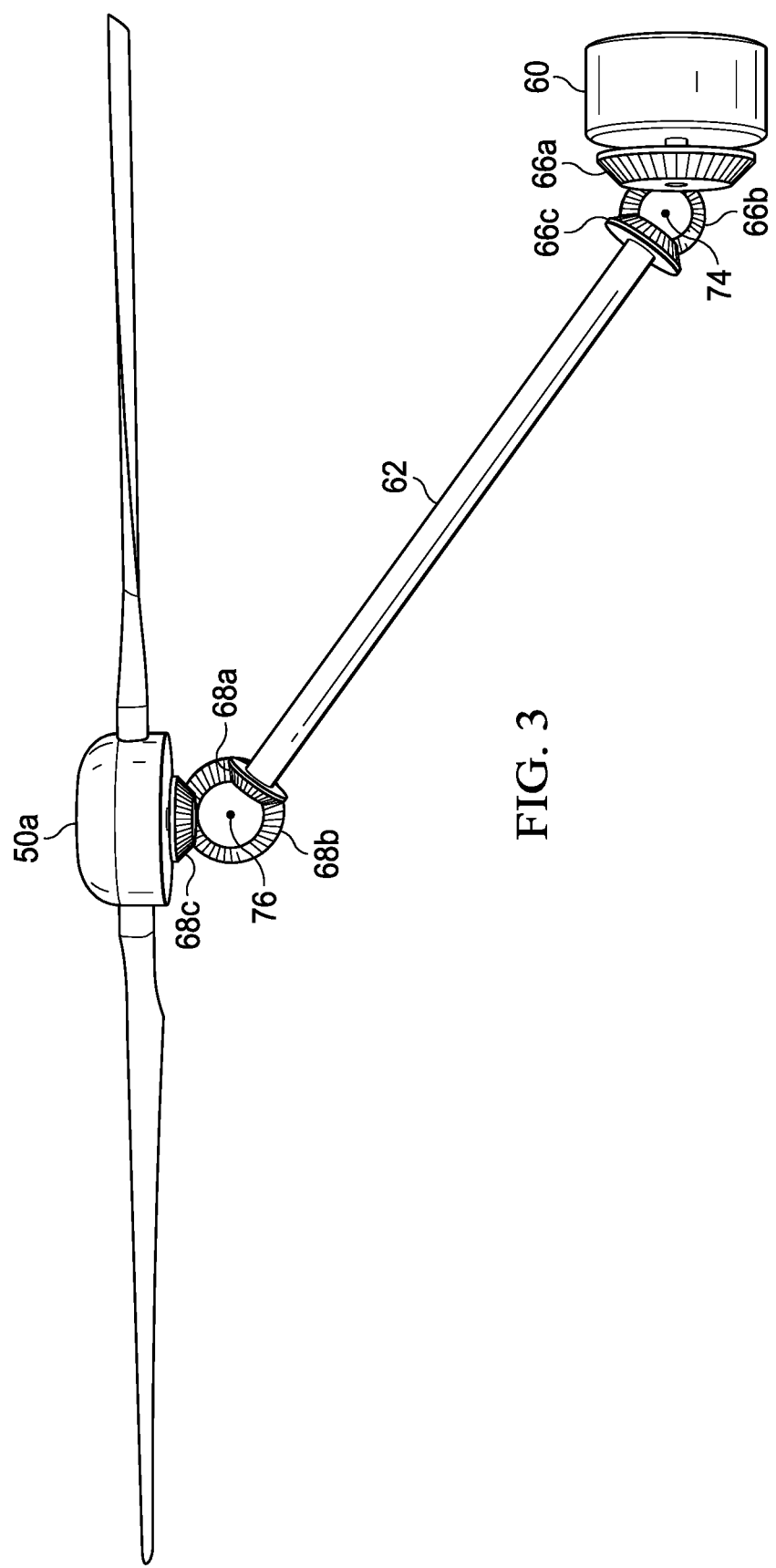
FIG. 3 is a side view of the drivetrain of a stowable lift rotor in accordance with embodiments of the present disclosure.

Referring to FIG. 3 in conjunction with FIGS. 2A-2D in the drawings, lift arm 48a includes a driveshaft 62 that transmits rotational energy from motor 60 at the proximal end of lift arm 48a to rotor assembly 50a at the distal end of lift arm 48a. In some embodiments, driveshaft 62 may be partially or fully encased or protected by a concentric shaft tube 64. At each end of driveshaft 62 are sets of bevel gears that facilitate the transfer of rotational energy through the drivetrain of lift arm 48a. On the proximal end of driveshaft 62, motor 60 rotates motor-interfacing bevel gear 66a, which transfers rotational energy to intermediate bevel gear 66b and proximal driveshaft bevel gear 66c. On the distal end of driveshaft 62, distal driveshaft bevel gear 68a transfers rotational energy to intermediate bevel gear 68b, which in turn transfers rotational energy to rotor assembly-interfacing bevel gear 68c to rotate rotor assembly 50a. While three bevel gears are utilized at each end of driveshaft 62, any number of bevel gears may be used at each end of driveshaft 62. It will be appreciated that gear types other than bevel gears may be used to transfer rotational energy through the drivetrain of stowable lift rotor 46a.

Lift arm 48a also includes a linkage 70, the proximal end of which is rotatably coupled to tailboom 22a and the distal end of which is rotatably coupled to a rotor hub housing 72 in which bevel gears 68a, 68b, 68c are disposed. Linkage 70, driveshaft 62 and rotor hub housing 72 form part of a four-bar linkage that extends through lift arm 48a to articulate stowable lift rotor 46a through a range of motion including the stowed, extended and intermediate positions. For example, linkage 70, driveshaft 62 and rotor hub housing 72 may form a trapezoidal or other type of four-bar linkage or pantograph mechanism. The proximal end of lift arm 48a pivots relative to tailboom 22a about axis 74 extending through intermediate bevel gear 66b and the distal end of lift arm 48a pivots relative to rotor assembly 50a about axis 76 extending through intermediate bevel gear 68b, which allows for power transfer from motor 60 to rotor assembly 50a in the extended position. The four-bar linkage and pivot axes 74, 76 enable rotor blades 52a of rotor assembly 50a to remain substantially parallel to tailboom 22a in both the stowed and extended positions as best seen in FIGS. 2B and 2D. More particularly, rotor blades 52a lie in a plane 78 in the stowed position as shown in FIG. 2B and rotate in a rotational plane 80 in the extended position as shown in FIG. 2D. Plane 78 is substantially parallel to rotational plane 80, placing rotor blades 52a in desirable plane orientations in both the stowed and extended positions.

Stowable lift rotor 46a includes an actuator assembly 82 to move lift arm 48a between the stowed and extended positions. Stowable lift rotor 46a thus relies on an active mechanism to move between the stowed and extended positions. In the illustrated embodiment, actuator assembly 82 includes a ball screw actuator assembly 84, which may include a motor and/or threaded rod. Actuator assembly 82 also includes an angled strut 86, a first end of which is coupled to ball screw actuator assembly 84 and a second end of which is coupled to lift arm 48a. Strut 86 may be coupled to lift arm 48a via a sleeve 88 that is in turn coupled to either shaft tube 64 or driveshaft 62. In alternate embodiments, the active system including actuator assembly 82 may instead be a passive system in which lift arm 48a passively moves between the stowed and extended positions in response to a magnitude of lift generated by rotor assembly 50a. In such passive systems, actuator assembly 82 may be replaced with, for example, a spring and/or damper to bias stowable lift rotor 46a in the stowed position and dampen the transmission of vibrations from rotor assembly 50a to tailboom 22a. In some such passive embodiments, a multistage retraction system may be used in which stowable lift rotor 46a passively retracts to an intermediate position between the extended and stowed positions as rotor assembly 50a slows down, at which point rotor assembly 50a may be locked and aligned. After rotor assembly 50a is locked and aligned, a pin and detent assembly or other type of mechanism may be used to allow stowable lift rotor 46a to move from the intermediate position to the stowed position.

Distance 90 between rotor assembly 50a and tailboom 22a in the extended position is greater than distance 92 between rotor assembly 50a and tailboom 22a in the stowed position. In some embodiments, distance 90 between rotor assembly 50a and tailboom 22a in the extended position may be a multiple of the length of another element of aircraft 10 such as the diameter of tailboom 22a or the chord of rotor blades 52a. It will be appreciated that distance 90 as shown in FIGS. 2C-2D between rotor assembly 50a and tailboom 22a is for illustration purposes only and that distance 90 may be on the order of millimeters, inches, feet or meters depending on the type of aircraft as well as other factors. Tailboom 22a forms a recess 94 to receive lift arm 48a in the stowed position. Tailboom 22a also forms an indent 96 to minimize the protrusion of rotor assembly 50a in the stowed position so that rotor assembly 50a is generally within the projected frontal area of the pylon of tailboom 22a. Furthermore, rotor assembly 50a locks into the stowed position shown in FIGS. 2A-2B when aircraft 10 is in the forward flight mode so that rotor blades 52a are parallel to tailboom 22a, thereby reducing drag by minimizing a frontal profile area of rotor assembly 50a exposed to freestream airflow in the forward flight mode.

Figure 4D:
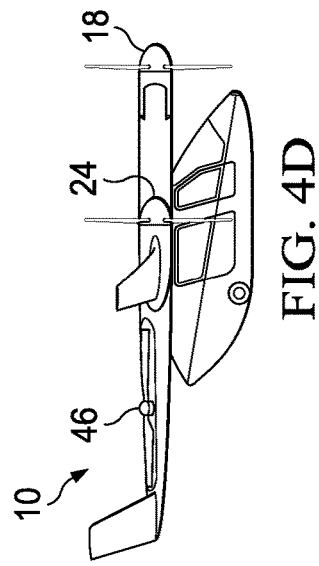
Figure 4C:
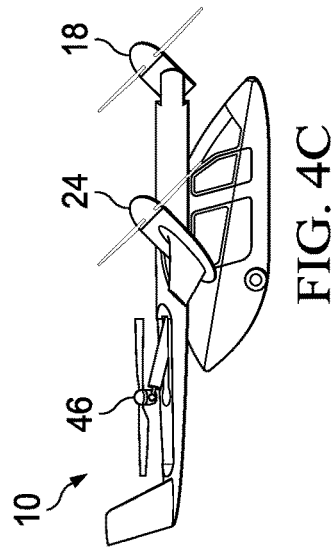
Figure 4B:
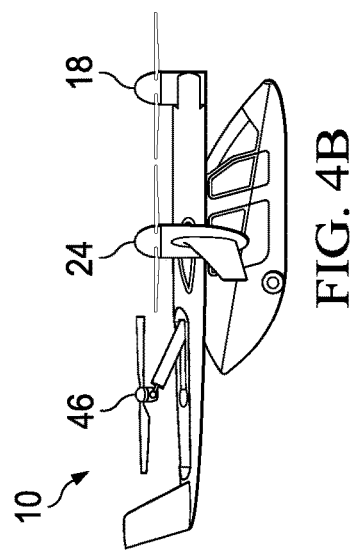
Figure 4A:
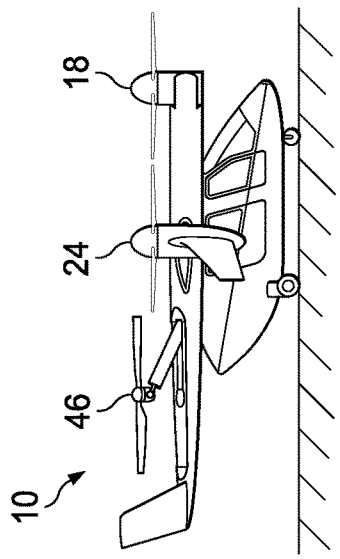

Referring additionally to FIGS. 4A-4H in the drawings, a sequential flight-operating scenario of aircraft 10 including forward propulsion systems 18a, 18b collectively referred to as forward propulsion systems 18, wing-mounted propulsion systems 24a, 24b collectively referred to as wing-mounted propulsion systems 24 and stowable lift rotors 46a, 46b, collectively referred to as stowable lift rotors 46 is depicted. As best seen in FIG. 4A, aircraft 10 is positioned on the ground prior to takeoff. When aircraft 10 is ready for a mission, an onboard flight control computer commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight. Stowable lift rotors 46 have been deployed into the extended position prior to takeoff and are ready to provide lift thrust. By raising stowable lift rotors 46 above head level of ground personnel or passengers, inadvertent collisions with a spinning rotor are also avoided.

As best seen in FIG. 4B, aircraft 10 has performed a vertical takeoff and is engaged in thrust-borne lift. As illustrated, the proprotor assemblies of forward propulsion systems 18 and wing-mounted propulsion systems 24 are rotating in the same horizontal plane. Stowable lift rotors 46 remain deployed in the extended position to provide lift. As the longitudinal axis and the lateral axis of aircraft 10 are both in the horizontal plane, aircraft 10 has a level flight attitude. During hover, the flight control computer may utilize individual variable speed and blade pitch control capability of forward propulsion systems 18, wing-mounted propulsion systems 24 and/or stowable lift rotors 46 to control flight dynamics to maintain hover stability and to provide pitch, roll and yaw authority for aircraft 10. In some implementations, each forward propulsion system 18, wing-mounted propulsion system 24 and/or stowable lift rotor 46 may be independently controllable such that operational changes to any of forward propulsion systems 18, wing-mounted propulsion systems 24 and/or stowable lift rotors 46 enable pitch, roll and yaw control of aircraft 10 during VTOL operations. In addition to vertical takeoff and landing, aircraft 10 may perform hovering and low speed directional movement in the VTOL flight mode.

Returning to the sequential flight-operating scenario of aircraft 10, after vertical ascent to the desired elevation, aircraft 10 may begin the transition from thrust-borne lift to wing-borne lift. As best seen from the progression of FIGS. 4B-4D, the angular positions of forward propulsion systems 18 and wing-mounted propulsion systems 24 are changed by a pitch down rotation to transition aircraft 10 from the VTOL flight mode toward the forward flight mode. As seen in FIG. 4C, forward propulsion systems 18 and wing-mounted propulsion systems 24 have been collectively inclined about 45 degrees pitch down. In the conversion orientations of aircraft 10, a portion of the thrust generated by forward propulsion systems 18 and wing-mounted propulsion systems 24 provides lift while a portion of the thrust generated by forward propulsion systems 18 and wing-mounted propulsion systems 24 urges aircraft 10 to accelerate in the forward direction such that the forward airspeed of aircraft 10 increases allowing the wings of aircraft 10 to offload a portion and eventually all of the lift requirement from forward propulsion systems 18, wing-mounted propulsion systems 24 and stowable lift rotors 46. In the conversion orientation, stowable lift rotors 46 have been locked to align with the tailbooms and have begun to move from the extended position to the stowed position. In some embodiments, stowable lift rotors 46 retract after having been locked to align with the tailbooms to provide adequate clearance between the lift rotor blades and the tailbooms as the rotational speeds of stowable lift rotors 46 decrease.

As best seen in FIGS. 4D-4E, forward propulsion systems 18 and wing-mounted propulsion systems 24 have been collectively inclined about 90 degrees pitch down such that the proprotor assemblies are rotating in vertical planes providing forward thrust for aircraft 10 while the wings provide lift. As forward flight with wing-borne lift requires significantly less thrust than VTOL flight with thrust-borne lift, the operating speed of forward propulsion systems 18 and wing-mounted propulsion systems 24 may be reduced particularly in embodiments having collective pitch control. In the forward flight mode, the independent rotor control provided by the flight control computer over each forward propulsion system 18 and/or wing-mounted propulsion system 24 may provide yaw authority for aircraft 10. In the forward flight mode, pitch and roll authority may be provided by the ailerons and/or elevators on the wings and/or tail assembly of aircraft 10. Stowable lift rotors 46 are in the stowed position to minimize the projected frontal area presented by stowable lift rotors 46, thereby reducing the drag penalty in forward flight.

As aircraft 10 approaches its destination, aircraft 10 may begin its transition from wing-borne lift to thrust-borne lift. As best seen from the progression of FIGS. 4E-4G, the angular positions of forward propulsion systems 18 and wing-mounted propulsion systems 24 are changed by a pitch up rotation to transition aircraft 10 from the forward flight mode toward the VTOL flight mode. As seen in FIG. 4F, forward propulsion systems 18 and wing-mounted propulsion systems 24 have been collectively inclined about 45 degrees pitch up. In the conversion orientations of aircraft 10, a portion of the thrust generated by forward propulsion systems 18 and wing-mounted propulsion systems 24 begins to provide lift for aircraft 10 as the forward airspeed decreases and the lift producing capability of the wings of aircraft 10 decreases. Stowable lift rotors 46 may begin to deploy into their extended positions. As best seen in FIG. 4G, forward propulsion systems 18 and wing-mounted propulsion systems 24 have been collectively inclined about 90 degrees pitch up such that the proprotor assemblies are rotating in the horizontal plane providing thrust-borne lift for aircraft 10. Once aircraft 10 has completed the transition to the VTOL flight mode, aircraft 10 may commence its vertical descent to a surface. As best seen in FIG. 4H, aircraft 10 has landed at the destination location. Stowable lift rotors 46 may remain in the extended position during landing and after touchdown to keep the spinning lift rotors above head level of any ground personnel or passengers, thereby preventing injuries.

Figure 5A:
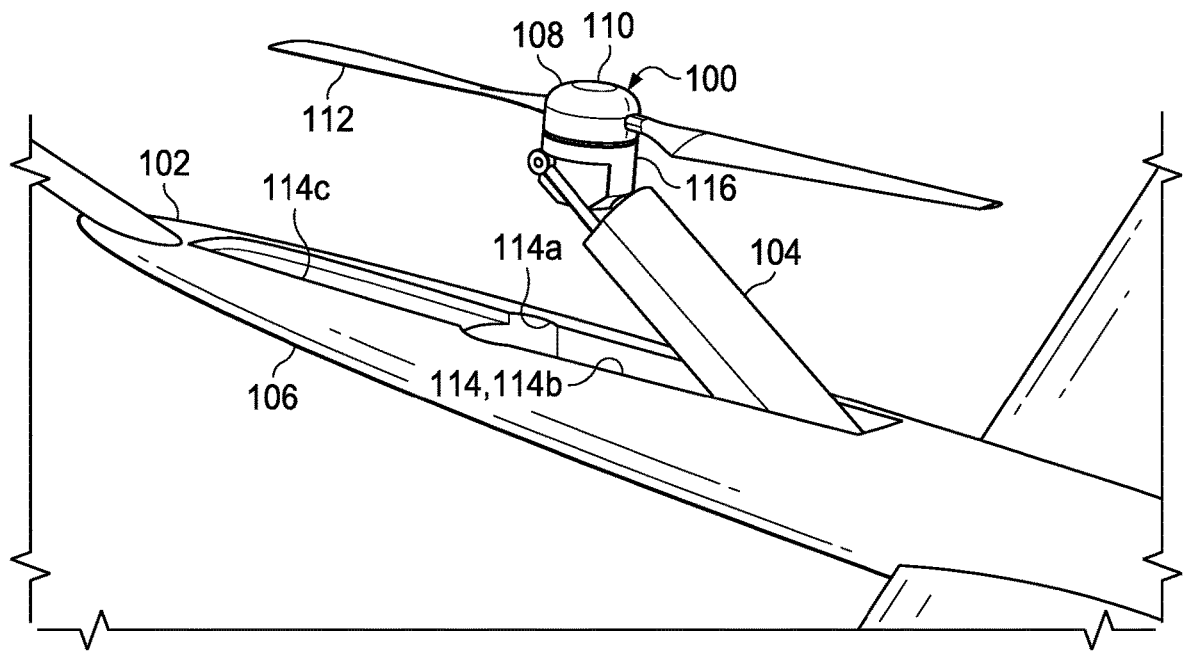
FIGS. 5A-5B are various views of a stowable lift rotor having rotor blades shrouded by a recess in the forward flight mode in accordance with embodiments of the present disclosure.
Figure 5B:
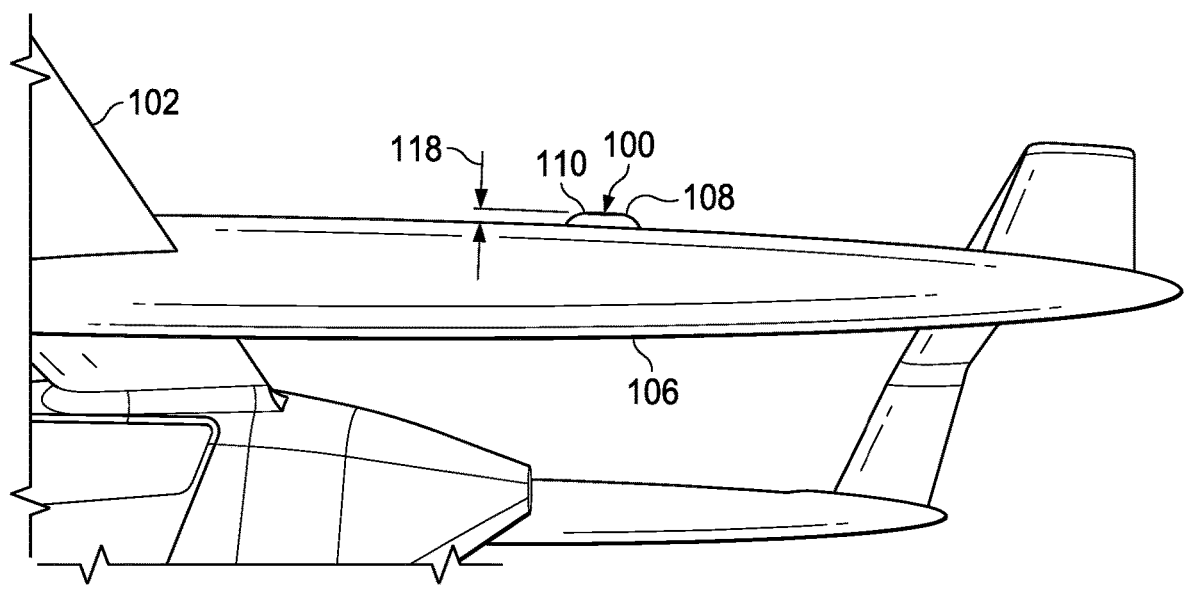

Referring to FIGS. 5A-5B in the drawings, stowable lift rotor 100 of aircraft 102 is depicted. Stowable lift rotor 100 includes lift arm 104, the proximal forward end of which is rotatably coupled to tailboom 106 and the distal aft end of which is rotatably coupled to rotor assembly 108. Rotor assembly 108 includes rotor hub 110 and rotor blades 112 extending radially therefrom. Stowable lift rotor 100 is movable between the extended position shown in FIG. 5A and the stowed position shown in FIG. 5B. Tailboom 106 forms recess 114. A central portion 114a of recess 114 receives rotor hub 110 and rotor hub housing 116 when stowable lift rotor 100 is in the stowed position. A forward portion 114b of recess 114 receives lift arm 104 as well as one of rotor blades 112 when stowable lift rotor 100 is in the stowed position. An aft portion 114c of recess 114 receives one of rotor blades 112 when stowable lift rotor 100 is in the stowed position. Before stowing stowable lift rotor 100, rotor assembly 108 is locked and aligned with tailboom 106, after which stowable lift rotor 100 is partially or fully received by recess 114. Recess 114 conforms to the outline of rotor blades 112 to reduce drag in forward flight. By receiving lift arm 104, rotor assembly 108 and rotor blades 112, recess 114 minimizes an amount 118 of stowable lift rotor 100 exposed to freestream airflow in the forward flight mode of aircraft 102.

Figure 6A:
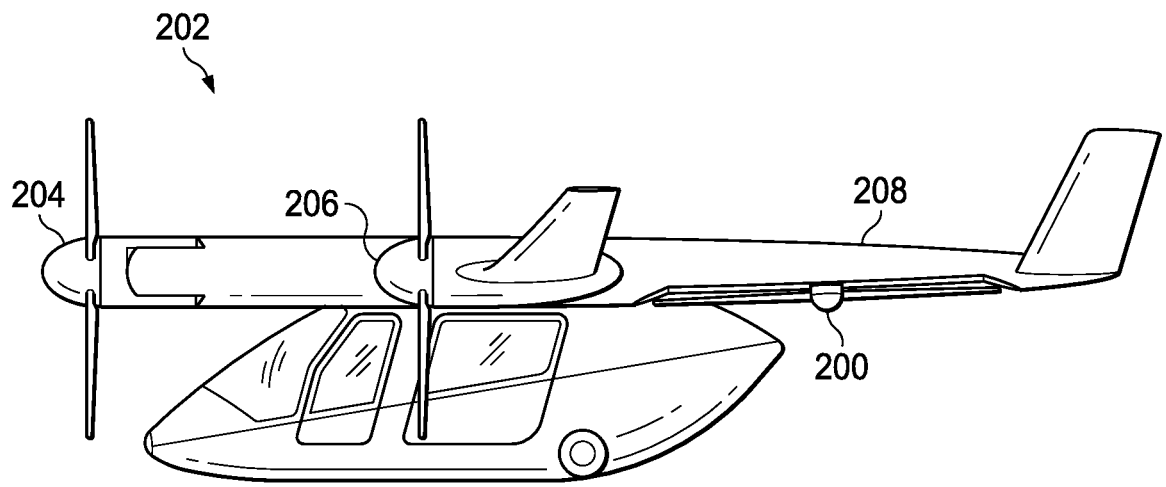
FIGS. 6A-6B are schematic illustrations of a VTOL aircraft utilizing a stowable lift rotor on the underside of a tailboom in accordance with embodiments of the present disclosure.
Figure 6B:
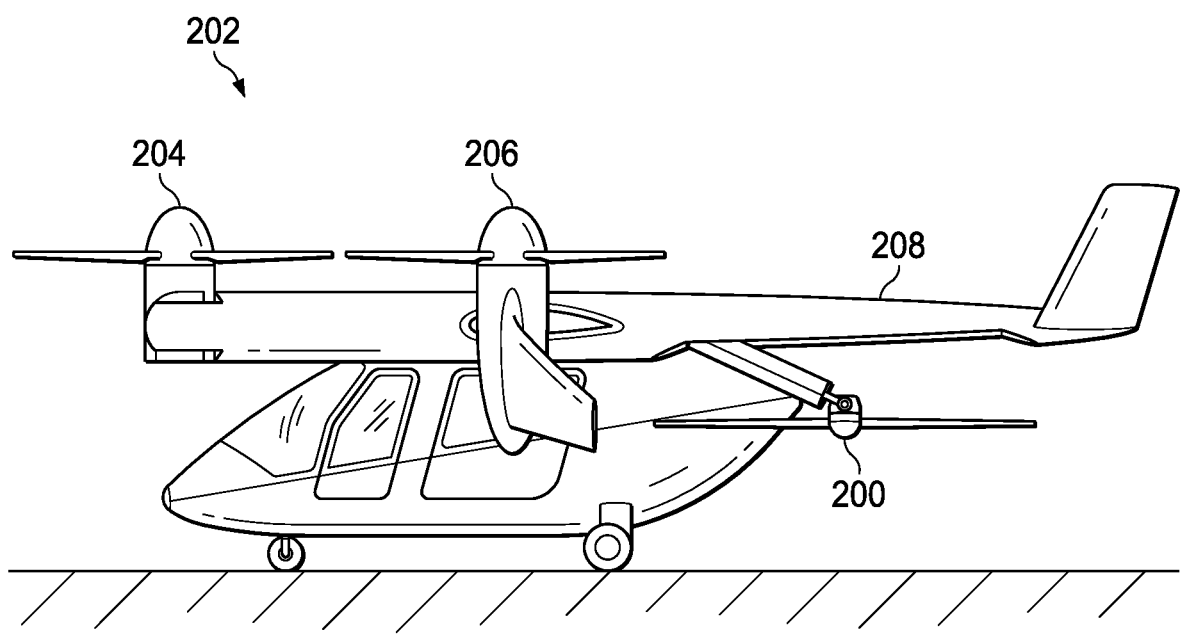

Referring to FIGS. 6A-6B in the drawings, a VTOL aircraft utilizing stowable lift rotors 200 is schematically illustrated and generally designated 202. Aircraft 202 includes forward propulsion systems 204 and wing-mounted propulsion systems 206. Forward propulsion systems 204 and wing-mounted propulsion systems 206 are rotatable between a generally horizontal orientation in the forward flight mode as shown in FIG. 6A and a generally vertical orientation in the VTOL flight mode as shown in FIG. 6B. Stowable lift rotors 200 are rotatably coupled to the underside of tailbooms 208. It may be beneficial to couple stowable lift rotors 200 on the underside of tailbooms 208 instead of the top or other portions of tailbooms 208 for performance, drag reduction, spatial economy or other considerations. In the forward flight mode shown in FIG. 6A, stowable lift rotors 200 are stowed and retracted to generally conform with the underside of tailbooms 208, thereby minimizing drag in forward flight. In the VTOL flight mode shown in FIG. 6B, stowable lift rotors 200 have been lowered and extended away from tailbooms 208 to increase rotor efficiency and decrease the noise produced by stowable lift rotors 200 when spinning in the VTOL flight mode.

Figure 7A:
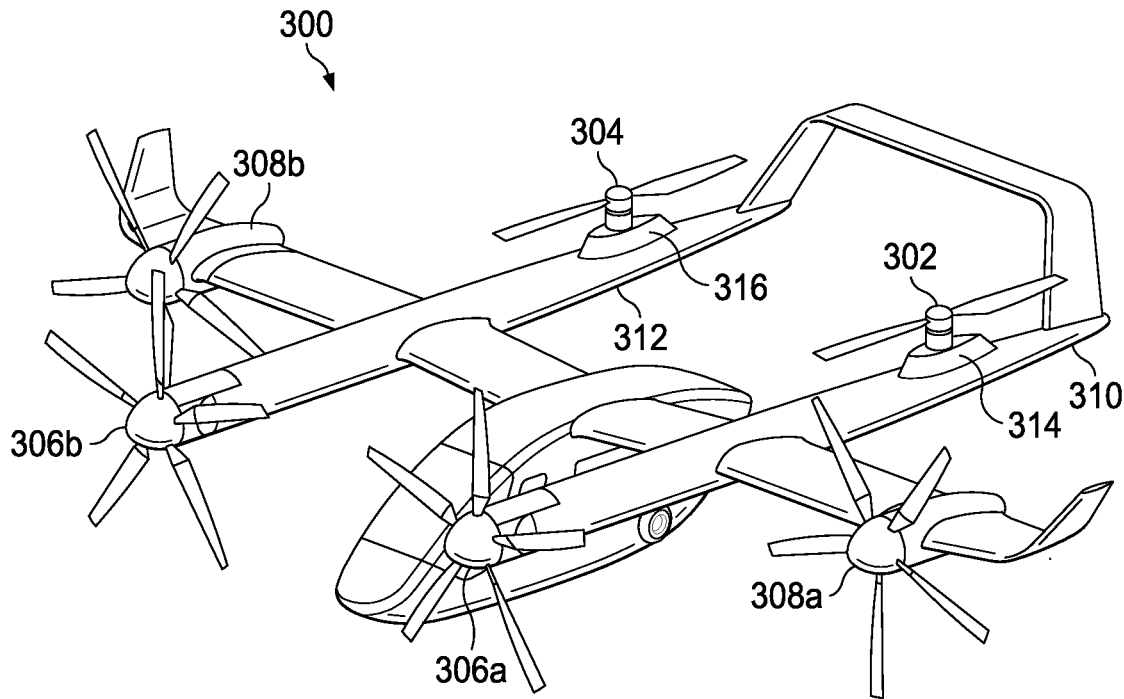
FIGS. 7A-7B are schematic illustrations of a VTOL aircraft utilizing stowable lift rotors having telescoping shaft assemblies in accordance with embodiments of the present disclosure.
Figure 7B:
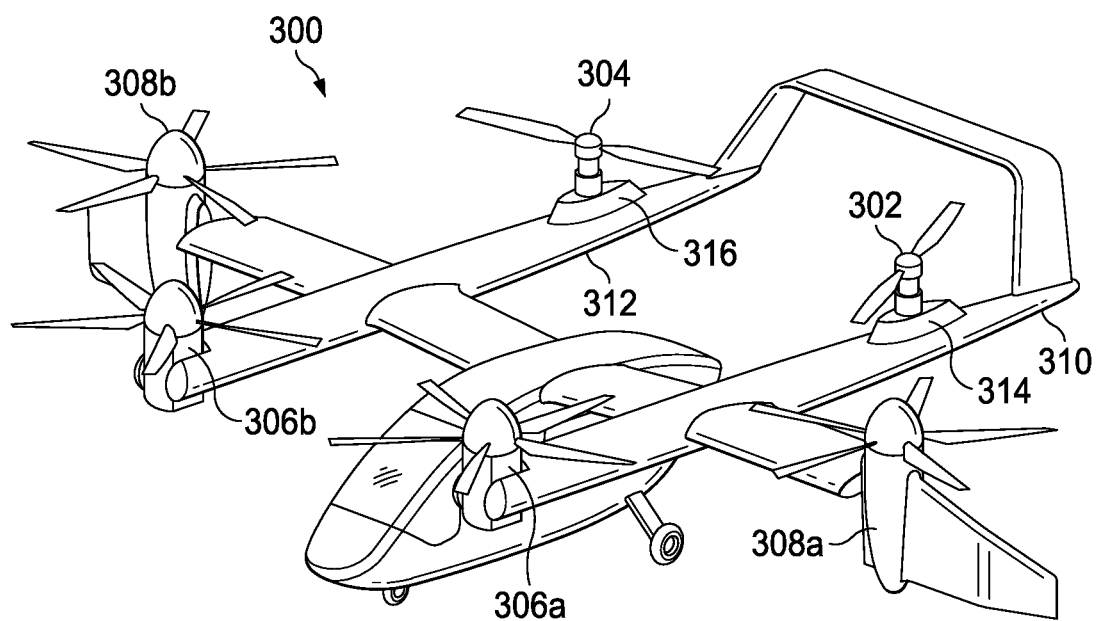

Referring to FIGS. 7A-7B in the drawings, an aircraft 300 including stowable lift rotors 302, 304 is schematically illustrated. Aircraft 300 includes forward propulsion systems 306a, 306b and wing-mounted propulsion systems 308a, 308b. Forward propulsion systems 306a, 306b and wing-mounted propulsion systems 308a, 308b have a generally horizontal orientation in the forward flight mode shown in FIG. 7A and a generally vertical orientation in the VTOL flight mode shown in FIG. 7B. In the illustrated embodiment, stowable lift rotors 302, 304 rotate in a generally horizontal plane and are not canted in the inboard or outboard directions. Stowable lift rotors 302, 304 are coupled to the top sides of tailbooms 310, 312, respectively. In the illustrated embodiment, stowable lift rotors 302, 304 are mounted atop fairings 314, 316 to reduce the cross-sections of tailbooms 310, 312 exposed to the slipstreams of stowable lift rotors 302, 304. In other embodiments, however, stowable lift rotors 302, 304 may be coupled directly to tailbooms 310, 312 without fairings interposed therebetween. Stowable lift rotors 302, 304 are movable between the stowed position in the forward flight mode shown in FIG. 7A and the extended position in the VTOL flight mode shown in FIG. 7B.

Figure 8A:
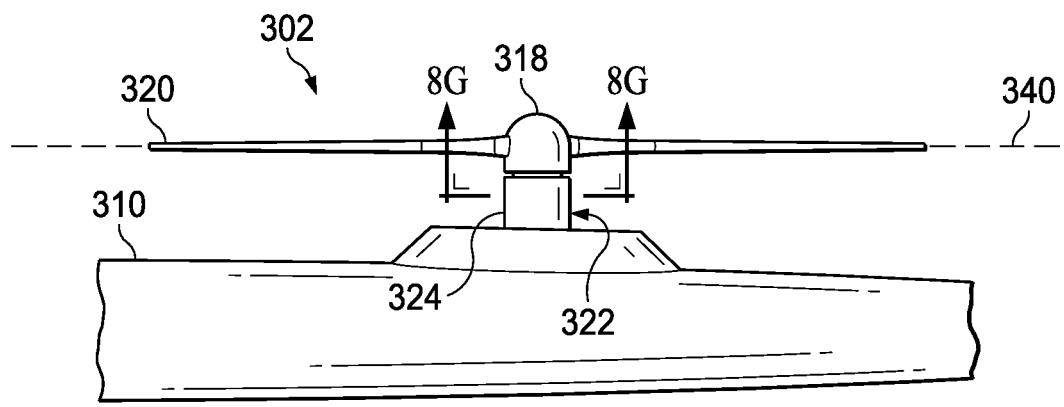
FIGS. 8A-8G are various views of a passive stowable lift rotor having a telescoping shaft assembly in accordance with embodiments of the present disclosure.
Figure 8B:
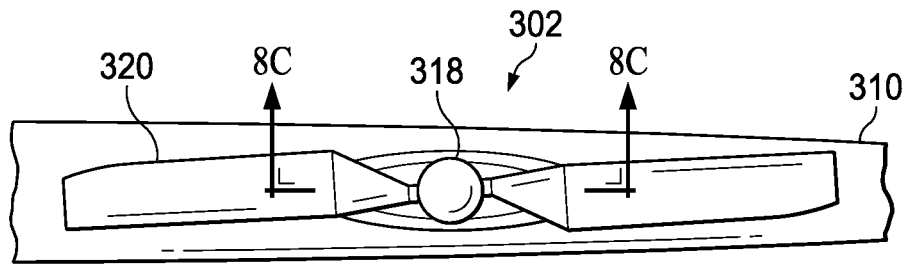
Figure 8C:
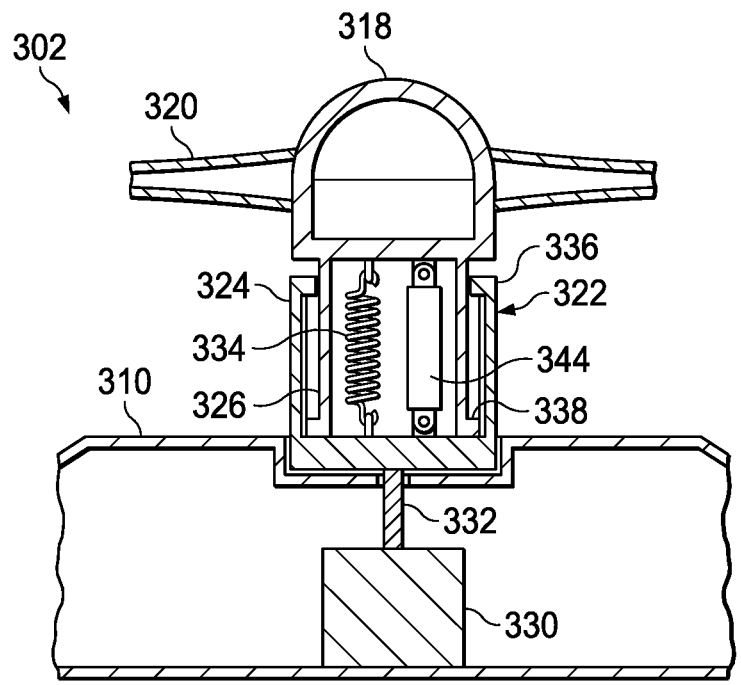
Figure 8D:
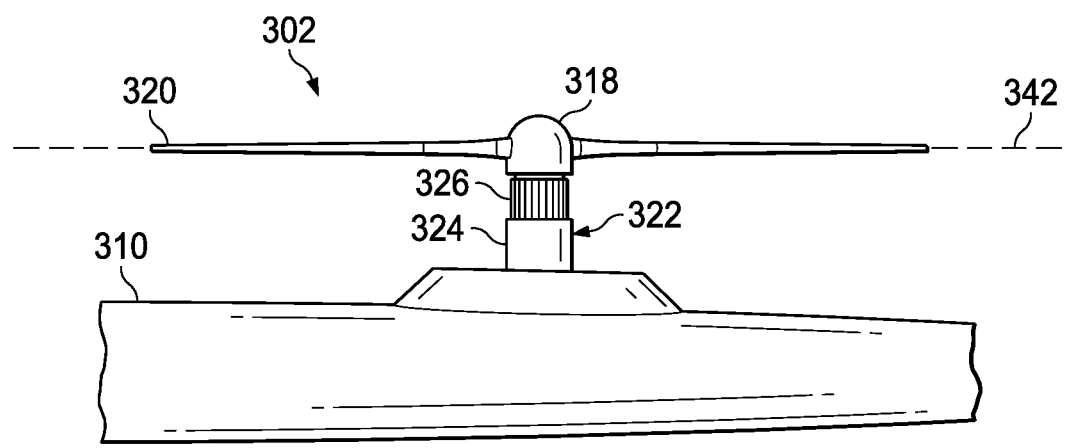
Figure 8E:
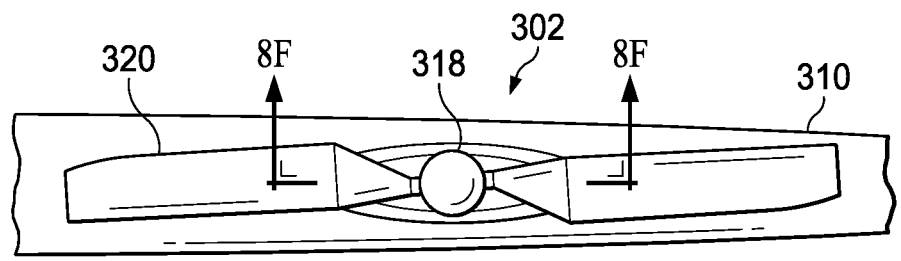
Figure 8F:
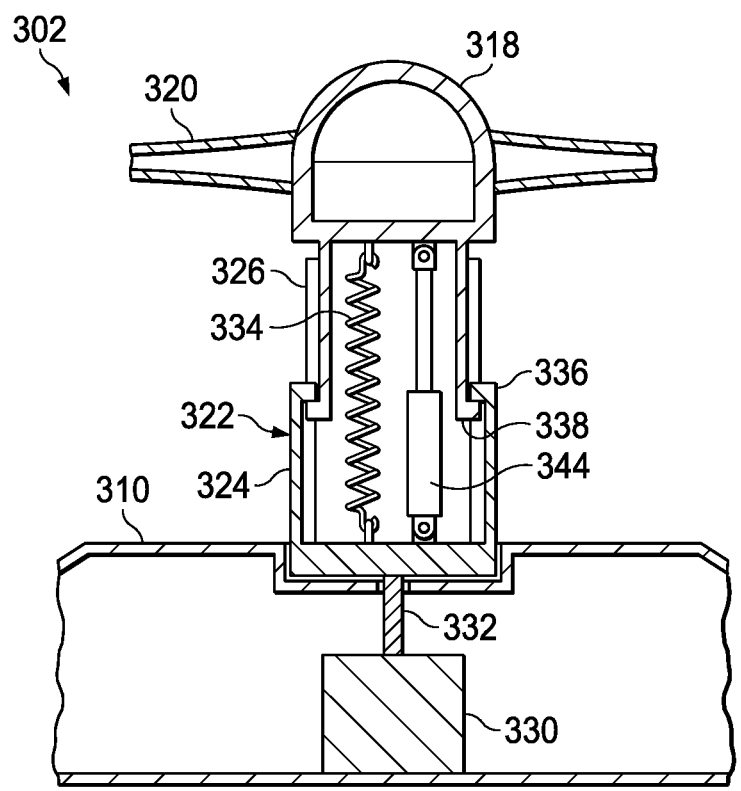

Referring additionally to FIGS. 8A-8G in the drawings, more detailed views of stowable lift rotor 302 in various positions are shown. Stowable lift rotor 302 is substantially similar to stowable lift rotor 304 therefore, for sake of efficiency, certain features will be disclosed only with regard to stowable lift rotor 302. One having ordinary skill in the art, however, will fully appreciate an understanding of stowable lift rotor 304 based upon the disclosure herein of stowable lift rotor 302. FIGS. 8A-8C show stowable lift rotor 302 in the stowed position and FIGS. 8D-8F show stowable lift rotor 302 in the extended position. Stowable lift rotor 302 includes rotor assembly 318 having rotor blades 320.

Figure 8G:
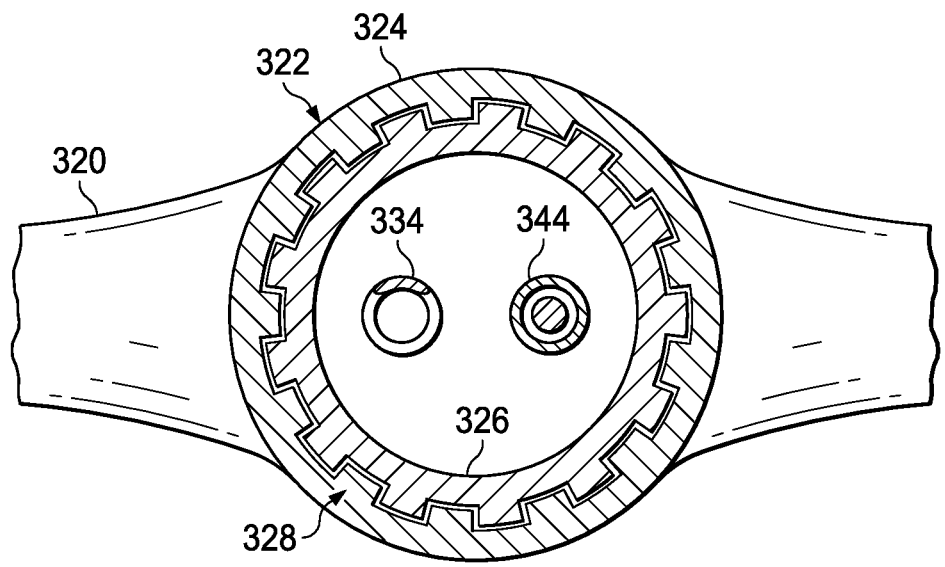

In the illustrated embodiment, the lift arm of stowable lift rotor 302 is a telescoping shaft assembly 322. Telescoping shaft assembly 322 includes a lower shaft 324 coupled to tailboom 310. Telescoping shaft assembly 322 also includes an upper shaft 326 coupled to rotor assembly 318. As best seen in FIG. 8G, lower shaft 324 is slidably coupled to upper shaft 326 at a slidable spline joint 328. More particularly, the inner surface of lower shaft 324 may form either a male or female spline and the outer surface of upper shaft 326 may form a complementary male or female spline to form slidable spline joint 328. In alternative embodiments, lower shaft 324 may be inside the inner surface of upper shaft 326. Stowable lift rotor 302 also includes motor 330 coupled to and disposed inside of tailboom 310. Motor 330 is adjacent to the proximal end of telescoping shaft assembly 322. Motor 330 rotates telescoping shaft assembly 322 via driveshaft 332. Telescoping shaft assembly 322 transfers rotational energy from motor 330 to rotor assembly 318. Slidable spline joint 328 transfers torque between lower shaft 324 and upper shaft 326.

Stowable lift rotor 302 utilizes a passive system in that telescoping shaft assembly 322 moves between the stowed position shown in FIGS. 8A-8C and the extended position shown in FIGS. 8D-8F in response to the magnitude of lift generated by rotor assembly 318. A spring 334 disposed inside of telescoping shaft assembly 322 forms part of the passive system that allows stowable lift rotor 302 to passively extend and retract. Spring 334 exerts a spring force that biases upper shaft 326 toward lower shaft 324. Spring 334 moves telescoping shaft assembly 322 into the stowed position in response to the spring force exceeding a lift force generated by rotor assembly 318. Conversely, rotor assembly 318 moves telescoping shaft assembly 322 into the extended position in response to the lift force generated by rotor assembly 318 exceeding the spring force. Upper and lower stops 336, 338 prevent the lift force generated by rotor assembly 318 from dislocating or overextending telescoping shaft assembly 322. Thus, when rotor assembly 318 is producing enough lift, the lift force extends telescoping shaft assembly 322 to stops 336, 338. When the lift force is reduced or removed, spring 334 retracts telescoping shaft assembly 322 back into the stowed position. Telescoping shaft assembly 322 passively extends as shown in FIGS. 8D-8F when aircraft 300 is in the VTOL flight mode to reduce noise and passively retracts as shown in FIGS. 8A-8C when aircraft 300 is in the forward flight mode to reduce drag. The telescoping configuration of stowable lift rotor 302 may further reduce noise and drag. The telescoping configuration of stowable lift rotor 302 also maintains the orientation of rotor assembly 318 in both the stowed and extended positions. More specifically, plane 340 in which rotor blades 320 lie in the stowed position is substantially parallel to rotational plane 342 through which rotor blades 320 rotate in the extended position.

Stowable lift rotor 302 also includes a damper 344 disposed inside telescoping shaft assembly 322. Damper 344 reduces vibration transmission between rotor assembly 318 and the airframe of aircraft 300 including tailboom 310. For example, rotor thrust fluctuation as rotor rotational speed is reduced may sometimes cause impulses. Damper 344 reduces or prevents the transmission of such impulses or natural frequencies. Non-limiting examples of damper 344 include a fluid elastic damper, a pneumatic damper or other types of shock absorbers. Stowable lift rotor 302 also has a beneficial failure mode in that should the telescoping action of telescoping shaft assembly 322 fail or should spring 334 and/or damper 344 fail, aircraft 300 is still capable of hovering or flying regardless of the position of telescoping shaft assembly 322.

Figure 9:
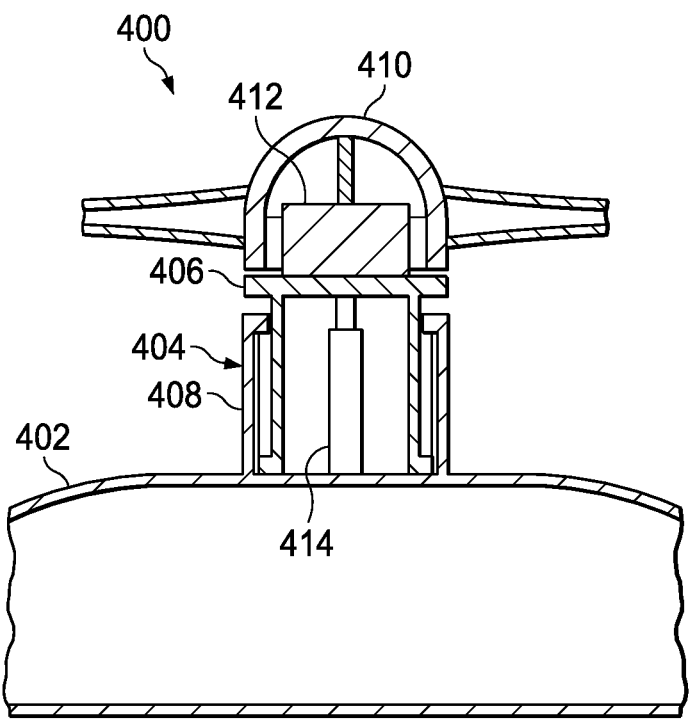
FIG. 9 is a cross-sectional view of an active stowable lift rotor having a telescoping shaft assembly in accordance with embodiments of the present disclosure.

Referring to FIG. 9 in the drawings, a stowable lift rotor 400 coupled to tailboom 402 of an aircraft is depicted. Stowable lift rotor 400 includes a telescoping shaft assembly 404 having upper and lower shafts 406, 408 slidably coupled to one another via a slidable spline joint. Lower shaft 408 is fixedly coupled to tailboom 402. Thus, telescoping shaft assembly 404 does not rotate relative to tailboom 402. Upper shaft 406 may be slidably coupled to lower shaft 408 using a slidable joint other than a slidable spline joint. Rotor assembly 410 is rotatably coupled to upper shaft 406. Motor 412 is coupled to upper shaft 406 and disposed within or adjacent to rotor assembly 410. Motor 412 rotates rotor assembly 410 via one or more driveshafts. Stowable lift rotor 400 utilizes an active system to move telescoping shaft assembly 404 between the extended and stowed positions. FIG. 9 shows telescoping shaft assembly 404 in the stowed position. Stowable lift rotor 400 utilizes actuator 414, which may be disposed inside telescoping shaft assembly 404 or elsewhere, to move telescoping shaft assembly 404 between the extended and stowed positions. Thus, the telescoping configuration of the stowable lift rotors disclosed herein may be moved between the extended and stowed positions either passively or actively.

Figure 10A:
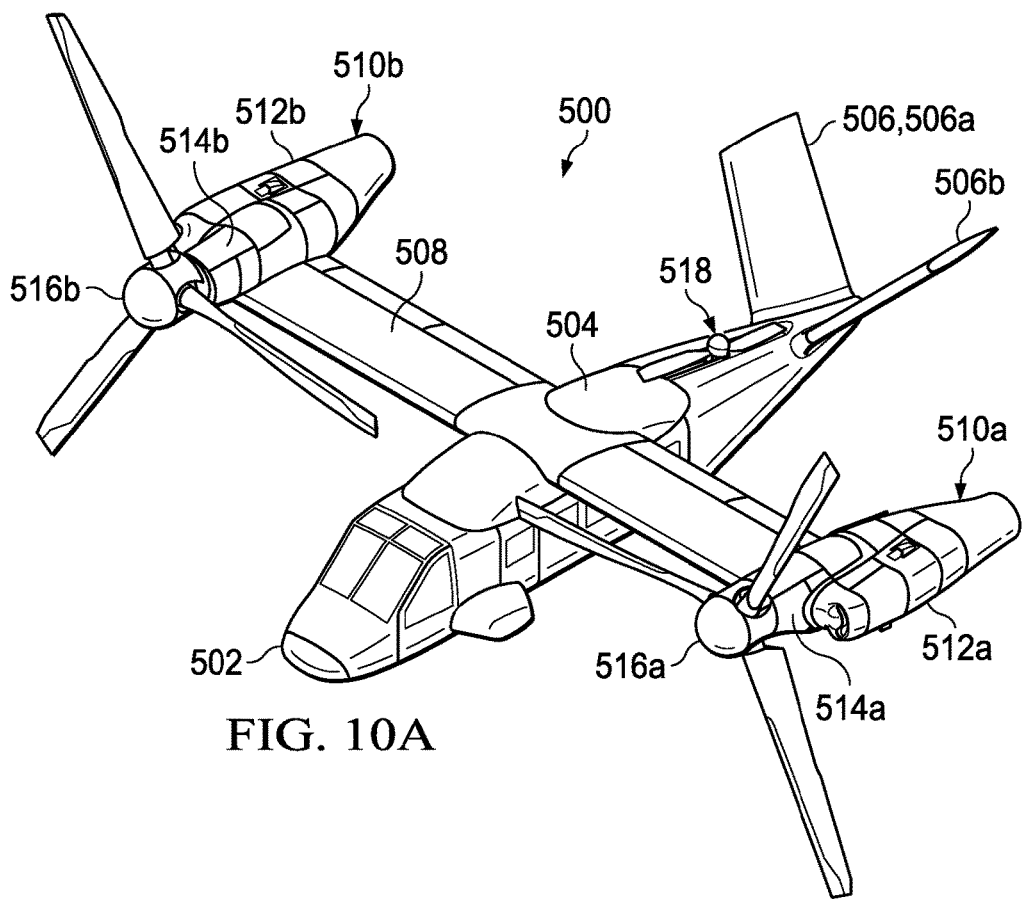
FIGS. 10A-10B are schematic illustrations of a tiltrotor aircraft utilizing a fuselage-mounted stowable lift rotor in accordance with embodiments of the present disclosure.
Figure 10B:
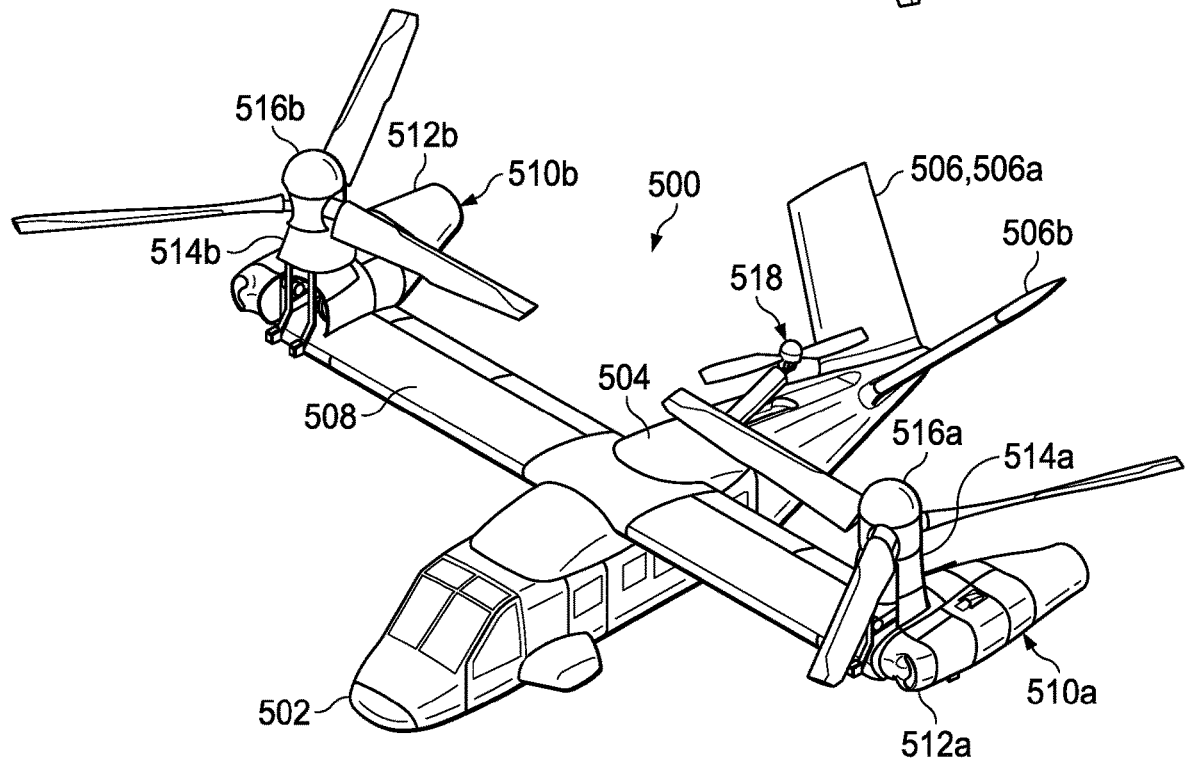

Referring to FIGS. 10A-10B in the drawings, a tiltrotor aircraft is schematically illustrated and generally designated 500. Tiltrotor aircraft 500 includes a fuselage 502, a wing mount assembly 504 and a tail assembly 506 including rotatably mounted tail members 506a, 506b having control surfaces operable for horizontal and/or vertical stabilization during forward flight. A wing assembly 508 is supported by wing mount assembly 504. Coupled to outboard ends of wing assembly 508 are propulsion assemblies 510a, 510b. Propulsion assembly 510a includes a nacelle depicted as fixed pylon 512a that houses an engine and a transmission. Thus, the nacelle is fixed relative to wing assembly 508. In addition, propulsion assembly 510a includes a mast assembly 514a having a mast that is rotatable relative to fixed pylon 512a, wing assembly 508 and fuselage 502 between a generally horizontal orientation, as best seen in FIG. 10A, and a generally vertical orientation, as best seen in FIG. 10B. Propulsion assembly 510a also includes a proprotor assembly 516a, including proprotor blade assemblies radiating therefrom, which is rotatable responsive to torque and rotational energy provided via a rotor hub assembly and drive system mechanically coupled to the engine and transmission housed by fixed pylon 512a. Similarly, propulsion assembly 510b includes a nacelle depicted as fixed pylon 512b that houses an engine and transmission and a mast assembly 514b that is rotatable relative to fixed pylon 512b, wing assembly 508 and fuselage 502. Propulsion assembly 510b also includes a proprotor assembly 516b, including proprotor blade assemblies radiating therefrom, which is rotatable responsive to torque and rotational energy provided via a rotor hub assembly and drive system mechanically coupled to the engine and transmission housed by fixed pylon 512b.

FIG. 10A illustrates tiltrotor aircraft 500 in airplane or forward flight mode, in which proprotor assemblies 516a, 516b are rotating in a substantially vertical plane to provide a forward thrust enabling wing assembly 508 to provide a lifting force responsive to forward airspeed, such that tiltrotor aircraft 500 flies much like a conventional propeller driven aircraft. FIG. 10B illustrates tiltrotor aircraft 500 in helicopter or VTOL flight mode, in which proprotor assemblies 516a, 516b are rotating in a substantially horizontal plane to provide a lifting thrust, such that tiltrotor aircraft 500 flies much like a conventional helicopter. It should be appreciated that tiltrotor aircraft 500 can be operated such that proprotor assemblies 516a, 516b are selectively positioned between the forward flight mode and the VTOL flight mode, which can be referred to as a conversion flight mode. Even though tiltrotor aircraft 500 has been described as having one engine in each fixed pylon 512a, 512b, it should be understood by those having ordinary skill in the art that other engine arrangements are possible and are considered to be within the scope of the present disclosure including, for example, having a single engine which may be housed within fuselage 502 that provides torque and rotational energy to both proprotor assemblies 516a, 516b.

Tiltrotor aircraft 500 includes stowable lift rotor 518. Stowable lift rotor 518 is in the stowed position in the forward flight mode shown in FIG. 10A to reduce drag and the extended position in the VTOL flight mode shown in FIG. 10B to reduce noise and improve rotor efficiency. Stowable lift rotor 518 is rotatably coupled to the top side of fuselage 502 at an aft portion thereof. Stowable lift rotor 518 may alternatively be rotatably coupled to an underside of fuselage 502 or any other portion of tiltrotor aircraft 500. In other embodiments, tiltrotor aircraft 500 may employ a telescoping configuration of a stowable lift rotor such as stowable lift rotor 302 in FIGS. 8A-8G. Indeed, the stowable lift rotors described herein may be implemented in various positions and configurations on a wide variety of aircraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A stowable lift rotor coupled to an airframe of an aircraft, the aircraft convertible between a vertical takeoff and landing flight mode and a forward flight mode, the stowable lift rotor comprising:
a lift arm having proximal and distal ends, the proximal end coupled to the airframe of the aircraft;
a four-bar linkage extending through the lift arm; and
a rotor assembly including a plurality of rotor blades coupled to the distal end of the lift arm;
wherein, the lift arm is movable between a plurality of positions including an extended position in the vertical takeoff and landing flight mode, a stowed position in the forward flight mode and intermediate positions therebetween such that a distance between the rotor assembly and the airframe is greater in the extended position than in the stowed position.

2. The stowable lift rotor as recited in claim 1 wherein the airframe forms a recess to receive the lift arm in the stowed position.

3. The stowable lift rotor as recited in claim 1 wherein the proximal end of the lift arm comprises a forward end rotatably coupled to the airframe of the aircraft and the distal end of the lift arm comprises an aft end rotatably coupled to the rotor assembly.

4. The stowable lift rotor as recited in claim 3 further comprising a motor coupled to the airframe of the aircraft adjacent to the proximal end of the lift arm;
wherein, the lift arm comprises a driveshaft transmitting rotational energy from the motor at the proximal end of the lift arm to the rotor assembly at the distal end of the lift arm, the driveshaft forming a link of the four-bar linkage.

5. The stowable lift rotor as recited in claim 4 further comprising a first plurality of bevel gears transmitting rotational energy from the motor to a proximal end of the driveshaft and a second plurality of bevel gears transmitting rotational energy from a distal end of the driveshaft to the rotor assembly.

6. The stowable lift rotor as recited in claim 4 wherein the rotor assembly comprises a rotor hub housing and the lift arm comprises a linkage having proximal and distal ends, the proximal end of the linkage rotatably coupled to the airframe of the aircraft and the distal end of the linkage rotatably coupled to the rotor hub housing, each of the rotor hub housing and the linkage forming a link of the four-bar linkage.

7. The stowable lift rotor as recited in claim 3 further comprising an actuator assembly configured to move the lift arm between the extended position and the stowed position.

8. The stowable lift rotor as recited in claim 7 wherein the actuator assembly comprises a ball screw actuator assembly and a strut, a first end of the strut coupled to the ball screw actuator assembly and a second end of the strut coupled to the lift arm.

9. The stowable lift rotor as recited in claim 1 wherein the plurality of rotor blades comprise first and second rotor blades; and
wherein, the rotor assembly is lockable in the stowed position such that the first and second rotor blades are parallel to a longitudinal axis of the aircraft, thereby reducing drag by minimizing a frontal profile area of the rotor assembly exposed to freestream airflow in the forward flight mode.

10. An aircraft convertible between a vertical takeoff and landing flight mode and a forward flight mode comprising:
a fuselage;
a tailboom coupled to the fuselage; and
a stowable lift rotor coupled to the tailboom, the stowable lift rotor comprising:
a lift arm having proximal and distal ends, the proximal end coupled to the tailboom;
a four-bar linkage extending through the lift arm; and
a rotor assembly including a plurality of rotor blades coupled to the distal end of the lift arm;
wherein, the lift arm is movable between a plurality of positions including an extended position in the vertical takeoff and landing flight mode, a stowed position in the forward flight mode and intermediate positions therebetween such that a distance between the rotor assembly and the tailboom is greater in the extended position than in the stowed position.

11. The aircraft as recited in claim 10 further comprising a wing coupled to the fuselage;
   wherein, the tailboom comprises left and right tailbooms coupled to the fuselage via the wing; and
   wherein, the stowable lift rotor comprises left and right stowable lift rotors, the left stowable lift rotor coupled to the left tailboom and the right stowable lift rotor coupled to the right tailboom.

12. The aircraft as recited in claim 10 wherein the plurality of rotor blades are rotatable in a first rotational plane in the extended position;
   wherein, the plurality of rotor blades lie in a second plane in the stowed position; and
   wherein, the first rotational plane is substantially parallel to the second plane.

* * * * *